United States Patent
Date

(10) Patent No.: US 8,279,319 B2
(45) Date of Patent: Oct. 2, 2012

(54) INFORMATION PROCESSING APPARATUS, INFORMATION PROCESSING METHOD, AND INFORMATION PROCESSING SYSTEM

(75) Inventor: Osamu Date, Saitama (JP)

(73) Assignee: Sony Corporation (JP)

( * ) Notice: Subject to any disclaimer, the term of this patent is extended or adjusted under 35 U.S.C. 154(b) by 1033 days.

(21) Appl. No.: 11/354,429

(22) Filed: Feb. 15, 2006

(65) Prior Publication Data

US 2006/0209089 A1    Sep. 21, 2006

(30) Foreign Application Priority Data

Feb. 15, 2005    (JP) ................................ P2005-037457

(51) Int. Cl.
- *H04N 5/222* (2006.01)
- *H04N 5/225* (2006.01)
- *H04N 5/228* (2006.01)
- *H04N 5/76* (2006.01)
- *G06K 15/00* (2006.01)
- *G06K 9/62* (2006.01)
- *G06K 9/60* (2006.01)

(52) U.S. Cl. ........... 348/333.02; 348/207.99; 348/207.1; 348/222.1; 348/231.99; 348/231.2; 348/231.3; 348/231.5; 348/333.05; 348/333.11; 358/1.18; 382/209; 382/217; 382/305

(58) Field of Classification Search .............. 348/207.1, 348/222.1, 231.2–231.3, 231.5, 207.99, 231.99–231.9, 348/333.01–333.05, 333.11; 345/629–636; 386/95, 125; 707/100, 104.1; 358/1.18; 382/209, 217, 305
See application file for complete search history.

(56) References Cited

U.S. PATENT DOCUMENTS

| | | | |
|---|---|---|---|
| 6,181,818 | B1 | 1/2001 | Sato et al. |
| 6,285,995 | B1 | 9/2001 | Abdel-Mottaleb et al. |
| 6,538,698 | B1 * | 3/2003 | Anderson ................ 348/333.05 |
| 6,564,206 | B1 | 5/2003 | Ikeda |
| 7,054,508 | B2 * | 5/2006 | Hanamoto ..................... 382/305 |
| 7,542,078 | B2 * | 6/2009 | Okusa ......................... 348/231.2 |
| 2001/0012062 | A1 * | 8/2001 | Anderson ..................... 348/222 |
| 2002/0128062 | A1 | 9/2002 | Pilu |
| 2002/0181783 | A1 | 12/2002 | Shiiyama |
| 2004/0030756 | A1 * | 2/2004 | Matsuyama et al. .......... 709/217 |
| 2004/0051787 | A1 * | 3/2004 | Mutsuro et al. .......... 348/211.99 |
| 2004/0090526 | A1 * | 5/2004 | Watanabe et al. .......... 348/207.1 |

(Continued)

FOREIGN PATENT DOCUMENTS

EP    1 003 322 A2    5/2000

(Continued)

*Primary Examiner* — Jason Chan
*Assistant Examiner* — Michael Osinski
(74) *Attorney, Agent, or Firm* — Lerner, David, Littenberg, Krumholz & Mentlik, LLP

(57) ABSTRACT

An information processing apparatus includes an image-information obtaining unit configured to obtain first image information; an information associating unit configured to generate first related information having certain content related to the first image information and to associate the first related information with the first image information; a display processor configured to use function data including second image information and condition information to display an image of the second image information, and to allow display of a representative image representing the first image information on the image of the second image information; a determining unit configured to determine whether the content of the first related information associated with the first image information satisfies a condition represented by the condition information; and a display controller configured to cause the display processor to display the representative image only when the determining unit determines that the condition is satisfied.

8 Claims, 12 Drawing Sheets

U.S. PATENT DOCUMENTS

| | | |
|---|---|---|
| 2004/0131336 A1* | 7/2004 | Matsuno et al. ............... 386/95 |
| 2005/0104976 A1* | 5/2005 | Currans .................... 348/231.5 |
| 2005/0157599 A1* | 7/2005 | Kiyama et al. ............ 369/30.03 |
| 2005/0168779 A1* | 8/2005 | Tsue et al. .................. 358/1.18 |
| 2005/0219665 A1* | 10/2005 | Mino ........................... 358/537 |
| 2006/0195486 A1* | 8/2006 | Ohno et al. ................... 707/200 |
| 2006/0291340 A1* | 12/2006 | Nonaka et al. ............ 369/30.25 |
| 2007/0263102 A1* | 11/2007 | Hirabayashi et al. ...... 348/231.2 |

FOREIGN PATENT DOCUMENTS

| | | |
|---|---|---|
| JP | 04 070729 | 3/1992 |
| JP | 07 271810 | 10/1995 |
| JP | 10 254903 | 9/1998 |
| JP | 2002-318807 A | 10/2002 |
| JP | 2002-329191 A | 11/2002 |
| JP | 2003-046832 A | 2/2003 |
| JP | 2003-132078 A | 5/2003 |
| JP | 2003-196668 A | 7/2003 |
| JP | 2003-333486 A | 11/2003 |
| JP | 2004-139548 A | 5/2004 |
| JP | 2004-318521 A | 11/2004 |

* cited by examiner

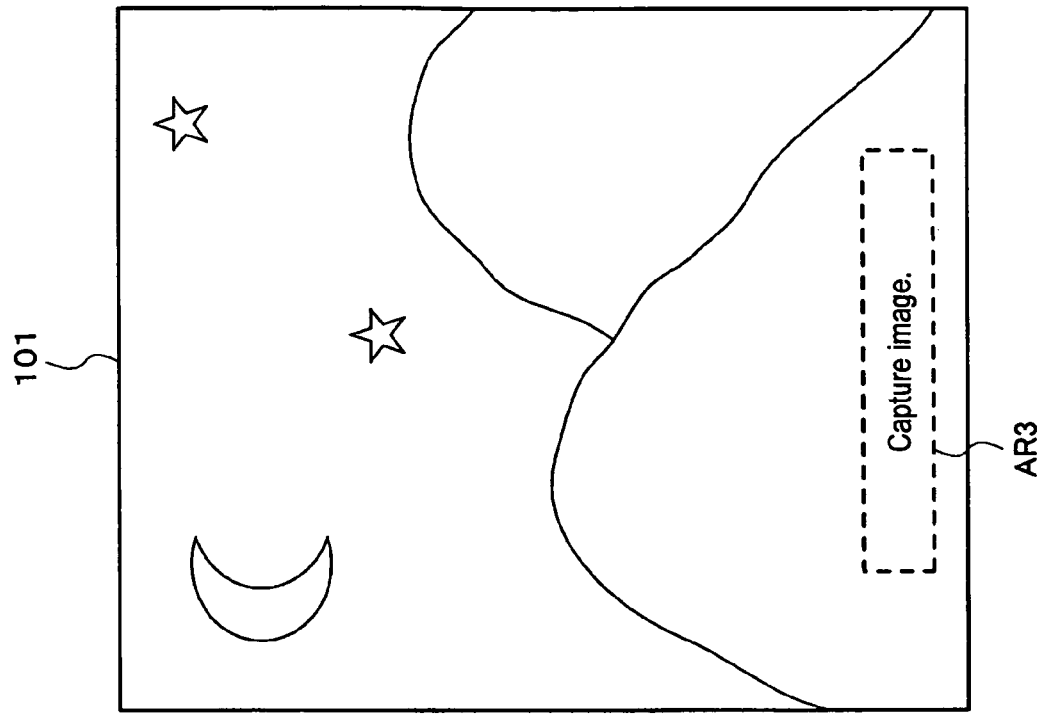
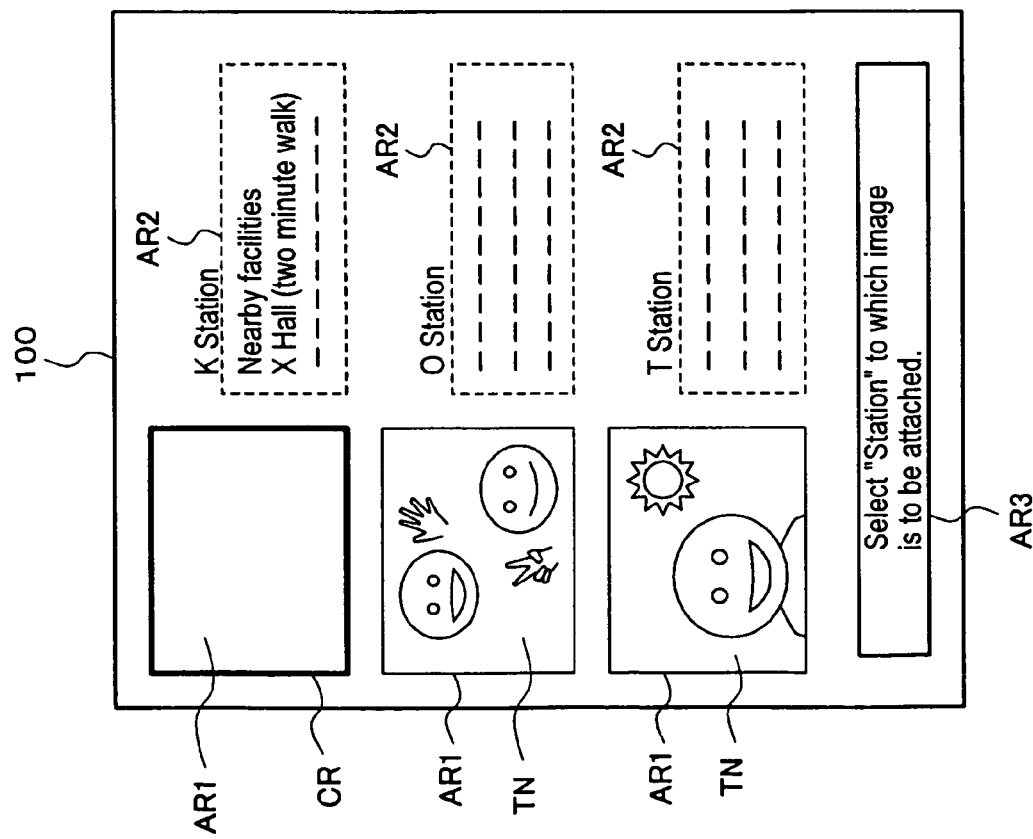

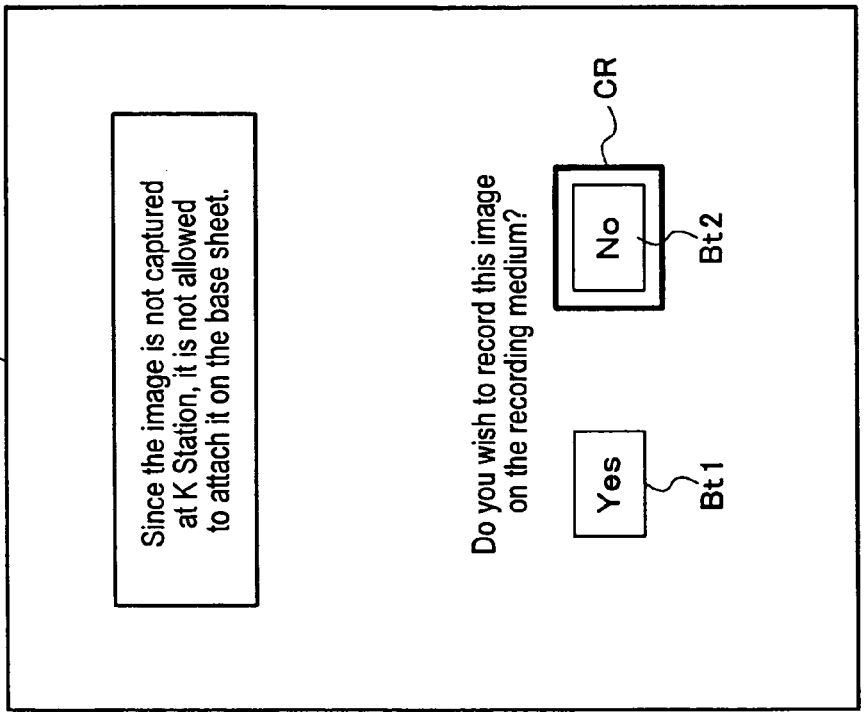
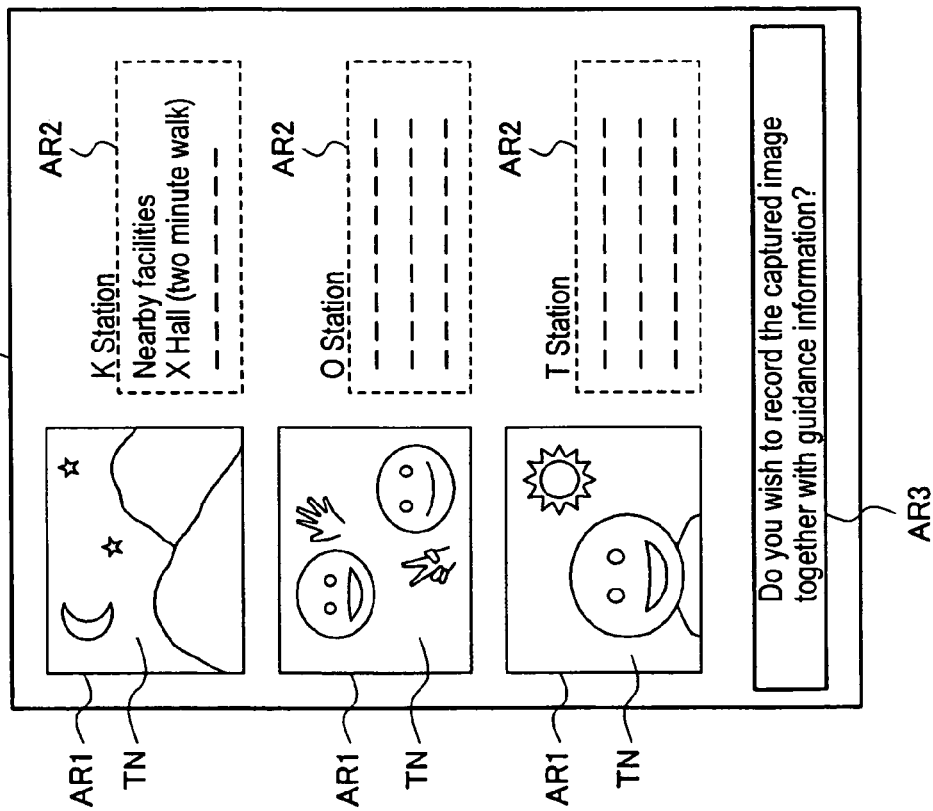

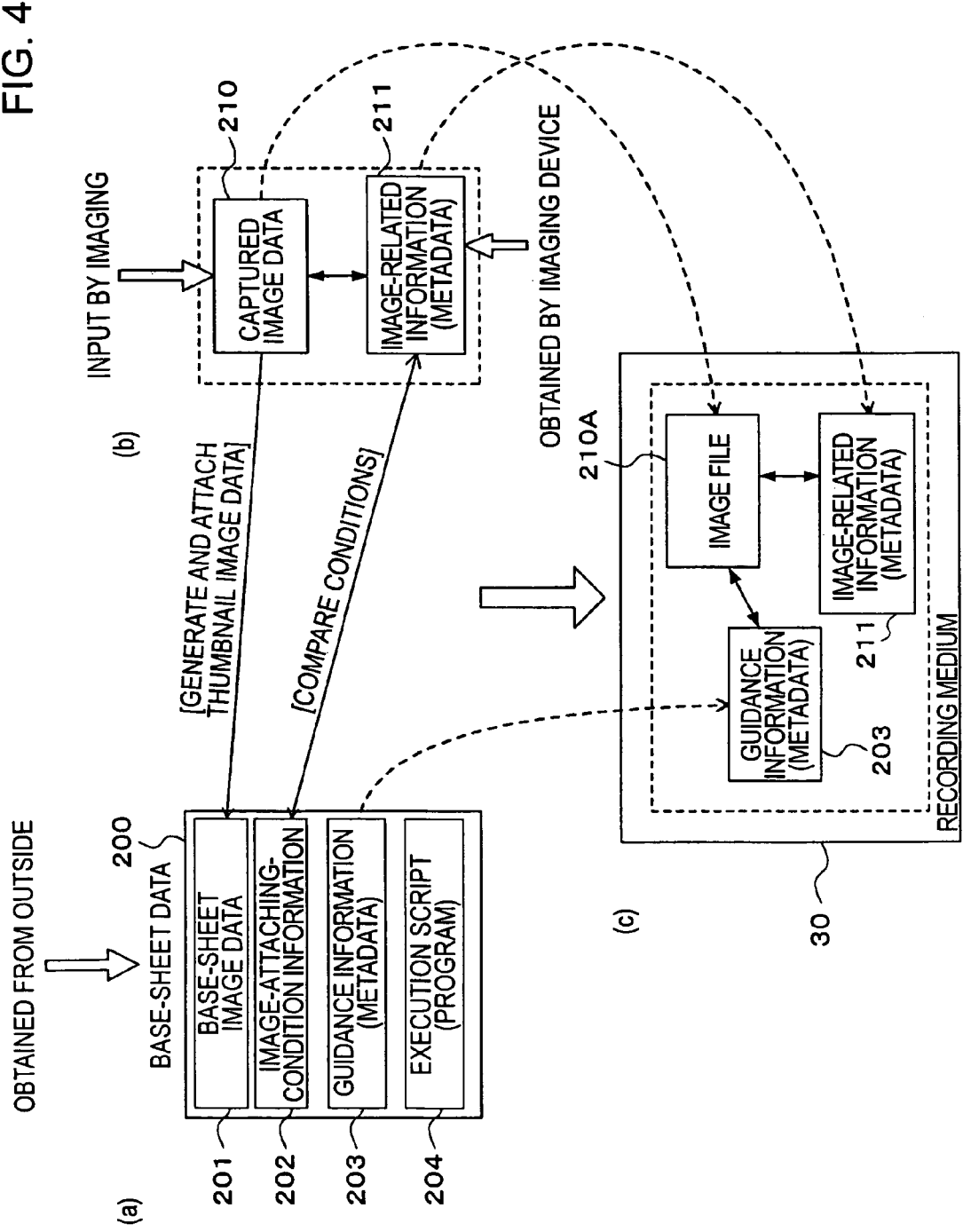

INFORMATION PROCESSING APPARATUS, INFORMATION PROCESSING METHOD, AND INFORMATION PROCESSING SYSTEM

CROSS-REFERENCE TO RELATED APPLICATIONS

The present application claims priority from Japanese Patent Application No. JP 2005-037457 filed on Feb. 15, 2005, the disclosure of which is hereby incorporated by reference herein.

BACKGROUND OF THE INVENTION

The present invention relates to an information processing apparatus for executing processing for displaying image information in the form of an image or for recording image information on a recording medium, and to an information processing method for the information processing apparatus. The present invention also relates to an information processing system including a server apparatus and a terminal apparatus that execute information processing regarding such image information.

For example, when managing image files, it is often the case that metadata having certain content related to the image files are associated with the respective image files so that the metadata can be used.

A typical example of usage of such metadata is file searching. More specifically, in order to search for an image file, a user enters a desired keyword as a search condition. In a searching process, first, metadata having content matching the keyword entered is searched for and identified, and an image file that is managed in association with the metadata identified is output as a result of searching. In the searching using such metadata, it is possible to perform searching using a keyword as a search condition instead of using a basic search condition such as a file name. Thus, the functionality of searching is enhanced. Such techniques are disclosed, for example, in Japanese Unexamined Patent Application Publication No. 2002-318807.

Although metadata is effective for use in searching or the like as described above, room for more effective use still remains.

SUMMARY OF THE INVENTION

According to an embodiment of the present invention, there is provided an information processing apparatus including image-information obtaining means for obtaining first image information; information associating means for generating first related information having certain content related to the first image information and for associating the first related information with the first image information; display processing means for using function data including at least second image information and condition information to display an image of the second image information on a display, and for allowing display of a representative image representing the first image information on the displayed image of the second image information; determining means for determining whether the content of the first related information associated with the first image information satisfies a condition represented by the condition information; and display controlling means for causing the display processing means to display the representative image only when the determining means determines that the condition is satisfied.

According to another embodiment of the present invention, there is provided an information processing method including obtaining first image information; generating first related information having certain content related to the first image information, and associating the first related information with the first image information; using function data including at least second image information and condition information to display an image of the second image information on a display, and allowing display of a representative image representing the first image information on the displayed image of the second image information; determining whether the content of the first related information associated with the first image information satisfies a condition represented by the condition information when displaying the representative image; and displaying the representative image only when it is determined that the condition is satisfied.

According to another embodiment of the present invention, there is provided an information processing system including a server apparatus and a terminal apparatus, the information processing system including creating means, provided at the server apparatus, for creating function data including at least second image information and condition information; first sending means, provided at the server apparatus, for sending the function data from the server apparatus to the terminal apparatus via a predetermined communication network; holding means, provided at the terminal apparatus, for receiving and holding the function data sent from the server apparatus; image-information obtaining means, provided at the terminal apparatus, for obtaining first image information; information associating means, provided at the terminal apparatus, for generating first related information having certain content related to the first image information, and for associating the first related information with the first image information; display processing means, provided at the terminal apparatus, for displaying an image of the second image information on a display on the basis of the function data held by the holding means, and for allowing display of a representative image representing the first image information on the displayed image of the second image information; determining means, provided at the terminal apparatus, for determining whether the content of the first related information associated with the first image information satisfies a condition represented by the condition information; display controlling means, provided at the terminal apparatus, for causing the display processing means to display the representative image only when the determining means determines that the condition is satisfied; and second sending means, provided at the terminal apparatus, for sending to the server apparatus at least information representing a result of display of the representative image on the image of the second image information and the first image information.

According to these embodiments, first image information obtained is associated with first related information (metadata). The first image information is used so that a representative image thereof is displayed on an image of second image information. The second image information, together with condition information, serves as function data. In order to display the representative image on the image of the second image information, a check is made as to whether the first related information associated with the first image information satisfies the condition information. That is, the representative image is displayed on the image of the second image information only when the first related information associated with the representative image satisfies the condition information.

According to these embodiments, metadata that serves as first related information associated with first image information obtained is used to determine whether a representative image is to be displayed on an image of second image information. Such use of metadata serves to provide users with applications having functions that have not been available. That is, metadata can be used effectively.

BRIEF DESCRIPTION OF THE DRAWINGS

FIGS. 2A and 2B are diagrams showing examples of a base-sheet image and associated information that are displayed in a procedure of a stamp rally according to the embodiment;

FIGS. 3A and 3B are diagrams showing examples of a base-sheet image and associated information that are displayed in the procedure of the stamp rally according to the embodiment;

FIG. 4 is a diagram showing data used in the stamp rally according to the embodiment, together with the structure of the data;

DETAILED DESCRIPTION

Now, an embodiment of the present invention will be described. In this embodiment, an information processing apparatus according to the present invention is implemented as an imaging device.

Figure 1:
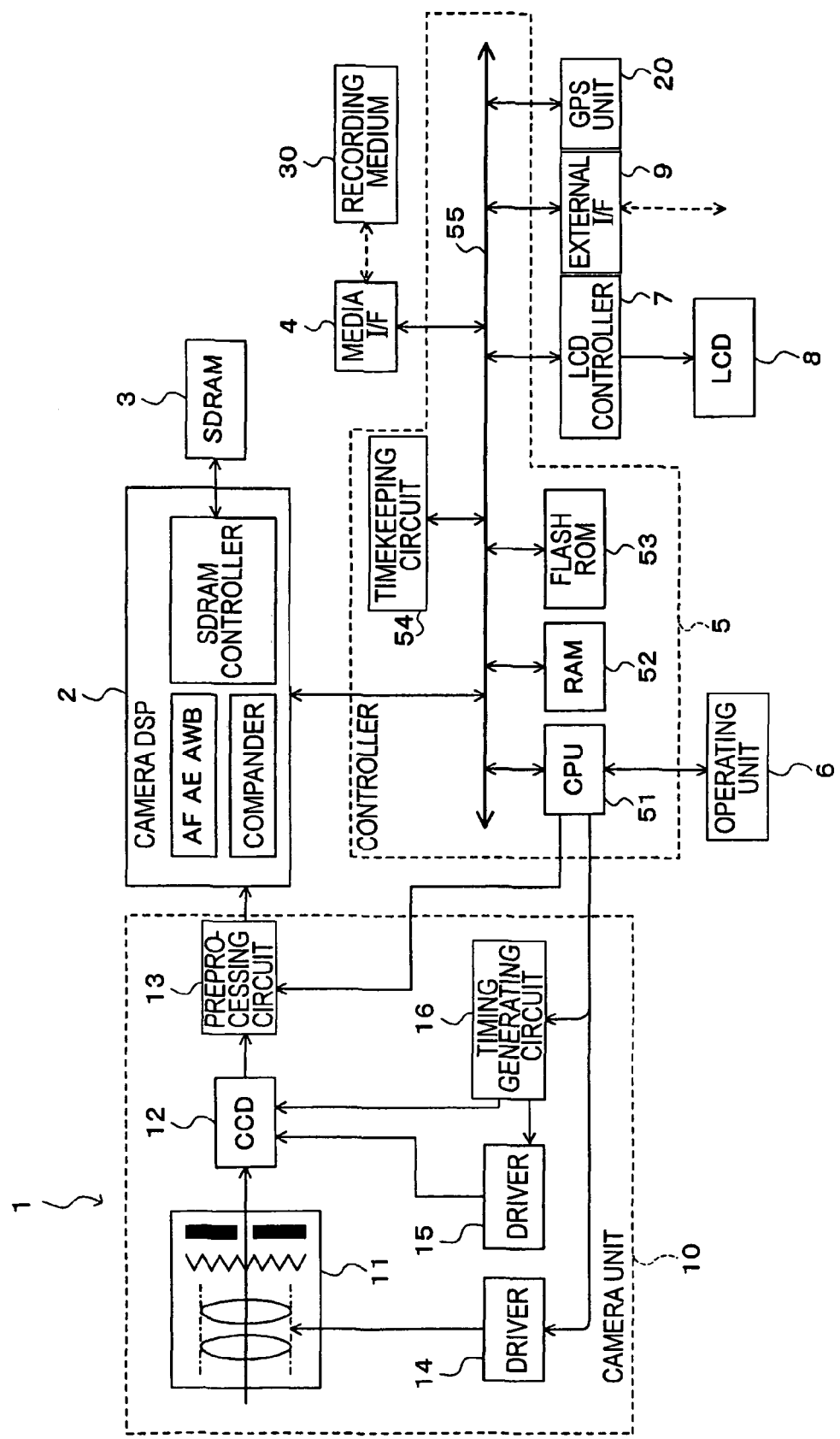
FIG. 1 is a block diagram showing the construction of an imaging device according to an embodiment of the present invention.

FIG. 1 is a block diagram showing an example construction of an imaging device 1 according to this embodiment.

Referring to FIG. 1, a camera unit 10 is a block for converting an image light captured through imaging by a lens optical system into a signal. The camera unit 10 includes an optical block 11, a charge coupled device (CCD) 12, a preprocessing circuit 13, an optical-block driver 14, a CCD driver 15, and a timing generating circuit 16.

The optical block 11 includes a lens optical system, a focus mechanism, a shutter mechanism, and an iris mechanism. The optical block 11 focuses captured incident light on a photoreceptor surface of the CCD 12.

In this embodiment, focus control, shutter control, aperture control, and so forth are exercised on the basis of driving signals output from the optical-block driver 14. That is, the optical-block driver 14 generates and outputs driving signals for driving the focus mechanism, the shutter mechanism, and iris mechanism, and so forth under the control of a controller 5, so that the focus mechanism, the shutter mechanism, the iris mechanism, and so forth operate according to the driving signals, whereby focusing, shutter operation, shutter speed, aperture value, and so forth are controlled appropriately.

The CCD 12 performs photoelectric conversion of light captured and received on the photoreceptor surface thereof, and sequentially outputs signal charges accumulated in accordance with the captured lights received on the photoreceptor surface, on the basis of timing signals output from the timing generating circuit 16, whereby electric signals corresponding to the captured lights are output.

The timing generating circuit 16 forms timing signals as needed under the control of the controller 5. The CCD driver 15 outputs driving signals to the CCD 12 on the basis of the timing signals fed from the timing generating circuit 16.

The photoelectric converter element (imaging element) is not limited to a CCD, and other types of element, such as a CMOS sensor, may be used.

The preprocessing circuit 13 receives input of signals output from the CCD 12, executes, for example, correlated double sampling (CDS) and automatic gain control (AGC), and then executes analog/digital (A/D) conversion, thereby converting the signals into digital signals.

The digital signals output from the preprocessing circuit 13 are fed to a camera DSP 2. The camera DSP 2 generates digital image data of a moving image or a still image as needed from the input digital signals. Furthermore, the camera DSP 2 performs camera signal processing on the digital image data, such as auto exposure (AE) and auto white balance (AWB).

The digital image data obtained in this manner is encoded for compression according to a predetermined compression scheme, and the compressed data is further encoded for recording, so that the resulting data can be transferred to a recording medium 30 via a system bus 55 and a media interface 4 and recorded thereon in a format where the data is managed as a file.

Furthermore, the camera DSP 2 performs, for example, video signal processing for displaying a monitor image of a captured image on a liquid crystal display (LCD) 8. The resulting image data for display is input to an LCD controller 7 via the system bus 55. The LCD controller 7 drives the LCD 8 according to the display image data input thereto. Accordingly, the LCD 8 displays, for example, a monitor image.

A file of image data recorded on the recording medium 30 is read under the control of the controller 5, and is input to the camera DSP 2 via the media interface 4 and the system bus 55. In this case, the camera DSP 2 decodes the data that has been encoded for recording, expands the data that has been compressed, and performs predetermined signal processing to obtain display image data similarly to the case described above, so that a corresponding image can be displayed on the LCD 8.

When executing the various types of signal processing described above, the camera DSP 2 uses, for example, a synchronous dynamic random access memory (SDRAM) 3 as a work area. Writing and reading of data to and from the SDRAM 3 are controlled by an SDRAM controller included in the camera DSP 2.

The controller 5 controls components of the imaging device 1. The controller 5 is implemented by a microcomputer including a central processing unit (CPU) 51, a random access memory (RAM) 52, a flash read-only memory (ROM) 53, and a timekeeping circuit 54, these components being connected to each other via the system bus 55.

The RAM 52 is used mainly as a work area for the CPU 51, for example, for temporarily storing results of operation executed by the CPU 51. The flash ROM 53 stores programs to be executed by the CPU 51, configuration data used for various types of processing, and so forth. The timekeeping circuit 54 keeps time so that information such as current year, month, and date, current day of week, and current time can be output.

An operating unit 6 herein includes input devices provided at certain positions of the case of the imaging device 1, such as various operating elements, a touch panel, and so forth. The operating unit 6 outputs an operation-information signal corresponding to a result of operation to the CPU 51. The CPU 51 exercises control and executes processing as needed in accordance with the operation-information signal input thereto.

An external interface 9 is provided so that the imaging device 1 can mutually communicate with external devices via a predetermined data interface.

The type of data interface that is actually used as the external interface 9 is not particularly limited. For example, a data interface for wired communications, such as an IEEE (Institute of Electrical and Electronics Engineers) 1394 interface or a USB (Universal Serial Bus) interface, may be used. Alternatively, a wireless data interface, such as a Bluetooth interface, may be used.

Yet alternatively, a network interface for wired or wireless communications may be used so that network connection with the Internet, a LAN, or the like is supported.

A GPS (Global Positioning System) unit 20 is a block that can obtain current-position information using the GPS. The CPU 51 of the controller 5 uses the current-position information obtained by the GPS unit 20 by retrieving it via the system bus 55 as needed.

In this embodiment, the imaging device 1 can be used in the following manner.

Let it be supposed that the user of the imaging device 1 is a tourist participating in a tour commercially provided by a travel agency. Furthermore, let it be supposed that the imaging device 1 owned by the user has obtained base-sheet data (function data) that can provide the imaging device 1 with a function of a base sheet for a stamp rally provided by the travel agency and has stored the base-sheet data on the recording medium 30 or the flash ROM 53 of the imaging device 1.

The scheme of obtaining the base-sheet data and storing the base-sheet data on the recording medium 30 or the flash ROM 53 is not particularly limited. For example, it is possible for the travel agency to transfer or lend the recording medium 30 storing the base-sheet data to the tourist, either for free or for charge. Alternatively, for example, the external interface 9 may be connected to a downloading apparatus so that the base-sheet data can be downloaded and recorded on the recording medium 30 or the flash ROM 53. It is also possible to connect the external interface 9 to a certain server via a network, such as the Internet, and to download the base-sheet data from the server. Furthermore, it is possible to provide the base-sheet data in the form of a two-dimensional barcode so that the imaging device 1 can obtain the base-sheet data by imaging and decoding the two-dimensional barcode.

Hereinafter, for simplicity of description, it is assumed that the base-sheet data is already stored on the recording medium 30.

In an ordinary stamp rally, a physical base sheet, such as a paper base sheet, is provided. A participant visits a plurality of places or sites designated in advance. When the participant arrives at each designated place or site, the participant affixes a stamp on the base sheet at that place or site. Thus, stamps of places or sites visited are accumulated on the base sheet. Depending on the type of stamp rally, for example, a prize or the like is given to a participant who affixed stamps of all the designated places or sites on the base sheet. After the stamp rally, the participant can keep the stamps on the base sheet for memory.

The user of the imaging device 1 (tourist) can participate in a stamp rally in a tour using the imaging device 1 of the user as a base sheet. In order to use the imaging device 1 as a base sheet, the recording medium 30 storing base-sheet data is mounted on the imaging device 1 so that the base-sheet data can be read via the media interface 4. Under this state, when the base-sheet data is activated by a predetermined operation on the operating unit 6, a base-sheet image is displayed in the form of a graphical user interface (GUI) screen. Instead of stamping, the user can attach images (pictures) captured by the imaging device 1 on the base-sheet image displayed, for example, by a procedure described below.

FIG. 2A shows an example of a base-sheet image 100 displayed in a display screen of the LCD 8, which is a display of the imaging device 1.

In the base-sheet image 100, an area including a thumbnail attaching area AR1 located on the left side of the screen and including a guidance-information displaying area AR2 located on the right side thereof is associated with a single place or site. In FIG. 2A, areas associated with three sites, namely, K Station, O Station, and T Station, are displayed.

In the thumbnail attaching area AR1, a thumbnail image (representative image) TN generated by reducing a captured image is attached and superposed. The thumbnail attaching area AR1 corresponds to a stamp affixing position in the case of a base sheet of an ordinary stamp rally. In the guidance-information displaying area AR2 on the left side of the thumbnail attaching area AR1, as information related to an associated place or site, guidance information, such as an introductory text regarding the place, or information regarding nearby facilities or historic sites, is displayed, for example, in the form of text.

Let it be supposed, for example, that the user of the imaging device 1 has arrived at K Station. The user participating in a stamp rally tries to attach an image captured in the vicinity of K Station on the base-sheet image 100 in order to keep a proof of visiting K Station. For this purpose, as shown in FIG. 2A, the user moves and locates a cursor CR to the thumbnail attaching area AR1 associated with K Station by an operation on the operating unit 6. At this stage, in a message area AR3 for presenting a message to the user, a message prompting the user to select a thumbnail attaching area AR1 where a thumbnail image is to be attached instead of stamping, for example, 'Select a "station" to which an image is to be attached', is displayed.

When the cursor CR is located to a desired thumbnail attaching area AR1 as described above and an operation is performed to fix the location, the imaging device 1 enters an imaging mode, and the display screen of the LCD 8 displays a monitor image of a current captured image, for example, as shown in FIG. 2B. At this time, in the message area AR3, a message prompting capturing of an image is displayed, for example, "Capture an image".

The user determines framing of an image to be captured as desired, and executes imaging. That is, the user performs a certain operation corresponding to operation of a shutter button.

Let it be supposed that the position where imaging is performed as described above is within a range that can be accepted as K Station. When this is recognized by the imaging device 1, the image captured is displayed in the thumbnail attaching area AR1 associated with K Station, as shown in part FIG. 3A.

As described above, in the base-sheet image 100, thumbnail images TN of images captured by the user are displayed in thumbnail attaching areas AR1 associated with places of imaging. That is, instead of stamps, images captured at sites visited are attached. By attaching thumbnail images TN to thumbnail attaching areas AR1 as described above, the base-sheet image 100 becomes an album including pictures captured by the user at respective main places and associated guidance information.

In the message area AR3 shown in FIG. 3A, a message (dialog) saying "Do you wish to record the captured image together with guidance information?" is displayed. The user can perform an operation to select Yes or No for the dialog.

Whether the user selects Yes or No, image data currently captured is recorded on the recording medium 30 as a single file. However, when the user selects Yes, guidance information that serves as a basis of information displayed in the guidance-information displaying area AR2 for K Station is also recorded on the same recording medium 30 so that the guidance information is managed in association with the image file. When the user selects No, only the image file is recorded without recording the guidance information.

In the state shown in FIG. 2B, when it is recognized by the imaging device 1 that the position where imaging is performed is not in the range where the position is accepted as K Station, instead of displaying a thumbnail image TN of the captured image on the base-sheet image 100, a dialog image 102 shown in FIG. 3B is displayed on a display screen of the LCD 8 instead of the base-sheet image 100.

The dialog image 102 presents a message indicating that it is not allowed to attach the captured image on the base sheet since the image is not captured within a range that can be accepted as K Station, for example, "Since the image is not captured at K Station, it is not allowed to attach the image on the base sheet".

As described above, in this embodiment, for example, a thumbnail image TN of a captured image is displayed in a selected thumbnail attaching area AR1 only when the selected thumbnail attaching area AR1 satisfies the required condition of position range. Thus, for example, a thumbnail image of an image captured by the user by mistake at a place not associated with the selected thumbnail attaching area AR1 is prevented from being displayed in the selected thumbnail attaching area AR1, so that the user is prevented from confusion. Furthermore, when the stamp rally is held as a game, invalid attachment and display of thumbnail images is prevented.

In this embodiment, as described above, even when it is not allowed to attach a thumbnail image TN of a captured image to a selected thumbnail attaching area AR1, it is allowed to record captured image data on a recording medium as an image file. Accordingly, in the dialog image 102 shown in FIG. 3B, a Yes button Bt1 and a No button Bt2 are displayed together with a dialog saying "Do you wish to record this image (image currently captured) on a recording medium?".

When the Yes button Bt1 is selected and an operation corresponding to clicking is performed, the image data currently captured is recorded on the recording medium 30 as an image file. The display screen returns from the dialog image 102 to the base-sheet image 100. On the other hand, when the No button Bt2 is selected and an operation corresponding to clicking is performed, the display screen returns to, for example, the base-sheet image 100 without recording the image data currently captured on the recording medium 30.

Now, a technical scheme for implementing the stamp rally according to this embodiment described with reference to FIGS. 2A to 3B will be described.

FIG. 4 shows data used in the stamp rally according to this embodiment together with the structure of the data, in accordance with the procedure described with reference to FIGS. 2A to 3B.

Part (a) of FIG. 4 shows base-sheet data 200. The base-sheet data 200 (function data) is recorded on the recording medium 30. The base-sheet data 200 includes information for displaying a GUI image of the base-sheet image 100 (second image information) and for allowing the imaging device 1 to execute processing in accordance with operations performed on the base-sheet image 100. The information herein includes base-sheet image data 201, image-attaching-condition information 202, guidance information 203 (second related information), and an execution script (program) 204.

The base-sheet image data 201 is composed of a set of image data of image materials for displaying images used in the stamp rally, such as the base-sheet image 100 shown in part FIG. 2A and FIG. 3A and the dialog image 102 shown in part FIG. 3B.

The image-attaching-condition information 202 includes a set of condition information for each designated imaging place (for each thumbnail attaching area AR1 in the base-sheet image 100). For example, condition information associated with K Station in the base-sheet image 100 shown in FIG. 2A and FIG. 3A at least includes information indicating that the imaging position be limited within a predetermined range with respect to the position of K Station. Furthermore, for example, regarding the date and time of imaging, information indicating that the date and time of imaging be within a predetermined range (e.g., 10:00 AM to 11:00 AM on Jan. 4, 2005) may be included. Then, for example, in the thumbnail attaching area AR1 associated with K Station, it is not allowed to attach and display a thumbnail image unless the thumbnail image is that of image data captured in the time range indicated by the time range information with the imaging device 1 located in the predetermined position range associated with K Station.

The guidance information 203 includes a set of data representing guidance information that serves as a basis of information displayed in the guidance-information displaying area AR2 for each designated place of imaging.

The execution script (program) 204 is a script or program that is written or constructed so that the operation of the stamp rally described with reference to FIGS. 2A to 3B is executed. The execution script (program) 204 is created using a certain markup language or a certain programming language, and is executed by the CPU 51. As described above, the base-sheet data 200 has a function of application software for implementing the stamp rally according to this embodiment.

Part (b) of FIG. 4 shows captured image data 210 (first image information). The captured image data 210 is generated by performing imaging in the state described with reference to FIG. 2A. Furthermore, along with generating the captured image data 210, image-related information (metadata) 211 (first related information) is generated and is associated with the captured image data 210. In this case, the image-related information 211 at least includes information representing a position at the time of imaging (imaging position information). Furthermore, it is possible to include information representing the date and time of imaging (imaging date and time information). The imaging position information can be obtained by capturing position information from the GPS unit 20 in accordance with the timing of imaging. The imaging date and time information can be obtained by capturing information of date and time from the timekeeping circuit 54 in accordance with the timing of imaging.

After generating the captured image data 210 and the image-related information 211 shown in part (b) of FIG. 4 as described above, the imaging-related information 211 is compared with the image-attaching-condition information 202 associated with the thumbnail attaching area AR1 to which the thumbnail image of the captured image data 210 is to be attached. Then, when it is recognized that the image-related information 211 satisfies the condition in the image-attaching-condition information 202, thumbnail image data of the captured image data 210 is generated, and the thumbnail image TN is attached to and displayed in the thumbnail attaching area AR1 selected in the base-sheet image 100.

Furthermore, as described with reference to FIG. 3A, when the thumbnail image TN is successfully attached to and displayed in the thumbnail attaching area AR1 of the base-sheet image 100, the guidance information 203 that serves as a basis of information displayed in the guidance-information displaying area AR2 associated with the thumbnail attaching area AR1, and the captured image data 210 that serves as a basis of the thumbnail image TN, can be recorded on the recording medium 30.

Part (c) of FIG. 4 shows the result of the recording. An image file 210A (first image information in the form of a file) shown in this figure is a file of the captured image data 210 generated by imaging. That is, the data is encoded for compression and recording as needed so that the data can be handled as a file. The image file 210A and associated guidance information 203 extracted from the guidance information on the base-sheet data 203 are recorded on the recording medium 30 so that these are managed in association with each other. Furthermore, in this case, the image-related information 211 is also recorded on the recording medium 30 so that it is managed in association with the image file 210A.

As described above, in this embodiment, together with the image file 210A generated from the captured image data 210, the guidance information 203 and the image-related information 211 can be recorded on the recording medium 30 in association with the image file 210A. It is possible to consider that, among the image file 210A, the guidance information 203, and the image-related information 211 associated with each other, the image file 210A serves as main information, and the guidance information 203 and the image-related information 211 serve as auxiliary information related to the main information, i.e., metadata related to the main data.

Figure 5:
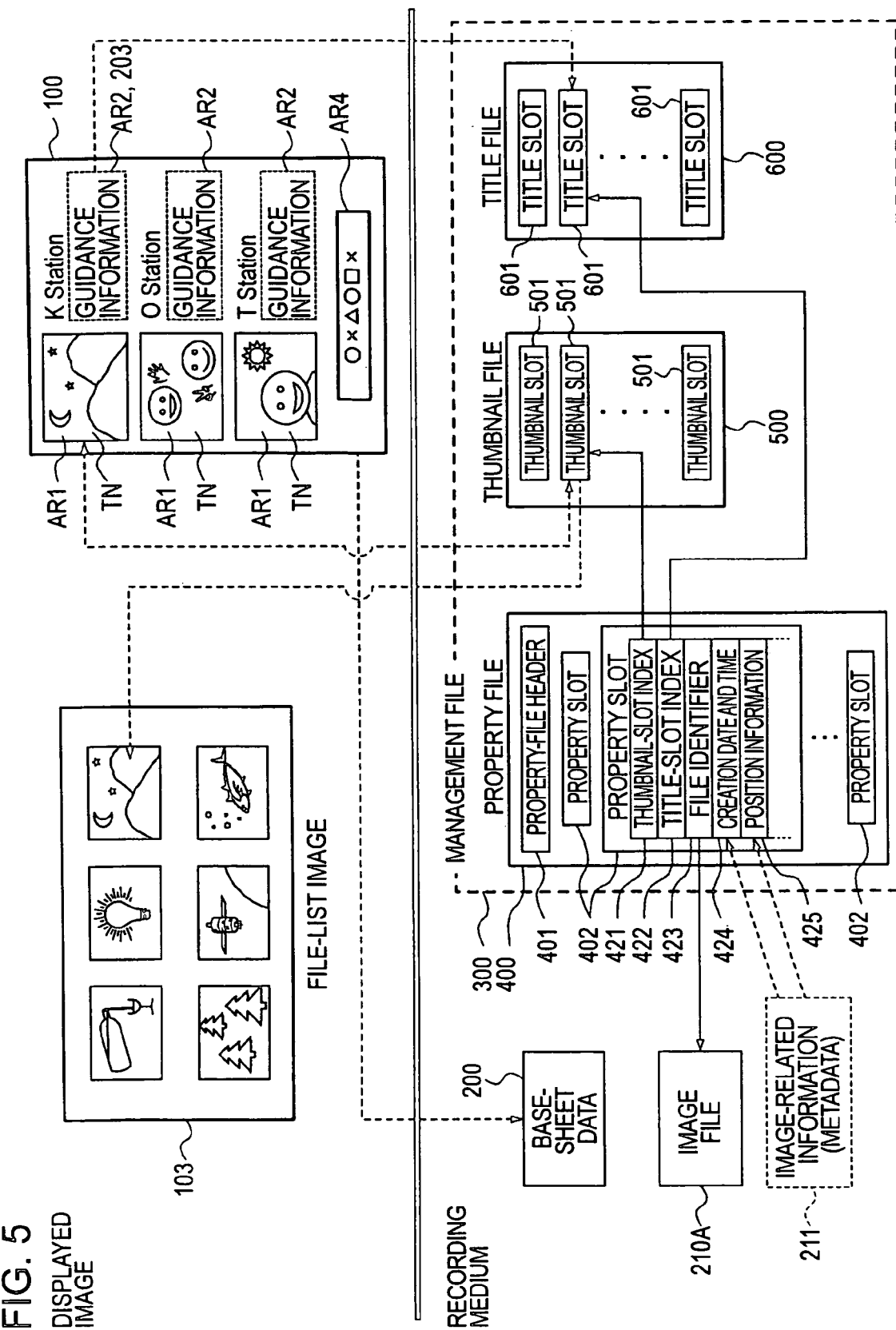
FIG. 5 is a diagram showing an example of management of an image file and metadata (guidance information and image-related information) and an example of information in a corresponding image that is displayed.

FIG. 5 shows an example scheme of management of the image file 210A and metadata (the guidance information 203 and the image-related information 211) recorded on the recording medium 30 as shown in FIG. 4. In this figure, in addition to the content recorded on the recording medium 30, a display image associated with management on the recording medium 30 is also displayed.

On the recording medium 30, the image file 210A and a management file 300 are recorded as files. In FIG. 5, in addition to these files, the base-sheet data 100 is recorded on the recording medium 30. In the case described above, together with the image file 210, metadata (the guidance information 203 and the image-related information 211) is also recorded on the recording medium 30. The metadata is not an independent file but is included in the structure of the management file 300 as will be described later.

Now, the structure of the management file 300 will be described.

The management file 300 is a file for storing and managing property information related to a single image file (limited to only one type of image file for the convenience of description) recorded on the recording medium 30. The management file 300 is managed and recorded as a single file on the recording medium 30. However, the structure thereof is divided into three subfiles, namely, a property file 400, a thumbnail file 500, and a title file 600.

The property file 400 includes a single property-file header 401 and one or more property slots 402 provided in association with respective image files. It is dictated that each of the property slots 402 has a fixed length.

The internal structures of the property-file header 401 and the property slots 402 will be described later.

The thumbnail file 500 includes one or more thumbnail slots 501. In principle, each thumbnail slot 501 is associated with a single image file 210A and stores thumbnail image data that is a representative image representing the associated image file 210A. It is dictated that each of the thumbnail slots 501 also has a fixed length.

The title file 600 includes one or more title slots 601. It is dictated that each title slot 601 is associated with a single image file 210A and has a fixed length. Each title slot 601 can store arbitrary data, such as text data.

Although the internal structure of the property-file header 401 is not shown in the figure, the property-file header 401 includes, for example, information representing the date and time of creation of a relevant property file, information representing the date and time of modification, information representing the size of each property slot 402, information representing the number of property slots 402 stored, a thumbnail-file list, a title-file list, and so forth.

The thumbnail-file list stores information representing the date and time of creation of the thumbnail file 500, information representing the date and time of modification of the thumbnail file 500, information representing the size of the of a thumbnail slot 501, information representing the number of thumbnail slots 501, and so forth.

The title-file list stores information representing the date and time of creation of the title file 600, information representing the date and time of modification of the title file 600, information representing the size of each title slot 601, the number of title slots 601 stored, and so forth.

Regarding the internal structure of each property slot 402, as indicated in the property file 400 shown in FIG. 5, the property slot 402 includes, for example, a thumbnail-slot index 421, a title-slot index 422, a file identifier 423, a date and time of creation 424, position information 425, and so forth.

The thumbnail-slot index 421 stores information specifying a thumbnail slot 501 associated with a relevant property slot 401. The thumbnail file 500 is formed by logically linking fixed-length thumbnail slots 501. Thus, for example, the thumbnail-slot index 421 specifies an order of arranging thumbnail slots 501 so that each thumbnail slot 501 can be identified.

The title-slot index 422 stores information specifying a title slot 601 associated with the relevant property slot 401. The title file 600 is formed by logically linking fixed-length title slots 601. Thus, by specifying an order of arranging title slots 601 in the title file 600, each title slot 601 can be identified.

The file identifier 423 stores a file identifier representing the image file 210A associated with the relevant property file.

As will be understood from the description given above, a single image file 210A recorded on the recording medium 30 is associated with a single property slot 401 on the basis of a file identifier 423. A thumbnail slot 501 can be identified by referring to the thumbnail-slot index 421 of the property slot 401. The thumbnail slot 501 is associated with the single image file 210A. Furthermore, the single title slot 601 that is identified by referring to the title-slot index 422 of the property slot 401 is also associated with the single image file 210A.

That is, in the management file 300, a single image file recorded on the recording medium 30, thumbnail image data (thumbnail slot 501) associated with the image file, and information representing arbitrary content related to the image file (metadata, or the title slot 601), are associated with each other on the basis of a property slot 402 of the property file 400.

Furthermore, in this case, the property slot 402 optionally stores information of the creation date and time 424 and the position information 425. The creation date and time 424 represents the date and time of creation of the image file 210A associated with the relevant property slot 402. The position information 425 represents the position where the image file 210A associated with the relevant property slot 402 is created.

The metadata (the guidance information 203 and the image-related information 211) recorded on the recording medium 30 in association with the image file 210A as shown in part (c) of FIG. 4 is managed in the following manner in the file management scheme on the recording medium 30 shown in FIG. 5.

The image-related information 211 has been described earlier as at least including position information and date and time information associated with the time of generating the image file (imaging time). The position information and the date and time information are stored respectively as the position information 425 and the creation date and time 424 of the property slot 402 of the associated image file 210A. The guidance information 203 is stored in the title slot 601 of the associated image file 210A. According to the scheme shown in FIG. 5, for convenience of description, metadata that serves as the guidance information 203 is extracted from the guidance-information displaying area AR2 in the base-sheet image 100 displayed in the form of a GUI screen, and is stored in the title slot 602. However, regarding the actual flow of guidance information, for example, the guidance information 203 read from the base-sheet data 200 and loaded in a RAM for displaying the base-sheet image 100 is included in the title slot 602 for recording and management.

As described above, according to this embodiment, the image data file 210A and the management file 300 are recorded, and the metadata is managed in the management file 300 as described above. Accordingly, it is possible to record and manage the single image file 210A and metadata such as the guidance information 203 and the image-related information 211 in association with each other.

Furthermore, as described earlier with reference to FIG. 3A a thumbnail image TN of a captured image is attached to the base-sheet image 100. The thumbnail image TN is attached by generating and using thumbnail-image data. Thus, as shown in FIG. 5, the thumbnail image data used for attaching the thumbnail image TN in the base-sheet image 100 can be recorded and managed on the recording medium 30 as thumbnail data that is to be stored in the thumbnail slot 501. Then, the image data once stored in the thumbnail slot 501 can be subsequently used, for example, to display the attached thumbnail image TN when the base-sheet data is activated to display the base-sheet image 100.

As shown in FIG. 5, thumbnail image data stored in the thumbnail slot 501 of the thumbnail file 500 can be used by displaying an icon (thumbnail image) representing a file when a file-list image is displayed on the LCD 8.

With the relationship between the thumbnail file 500 and the base-sheet image 100 or the file-list image, when a thumbnail image is displayed on the base-sheet image 100 or the file-list image, image processing for generating a thumbnail image from original image data need not be executed on each occasion, and it suffices to use thumbnail image data read by accessing a relevant thumbnail slot 501.

Figure 6:
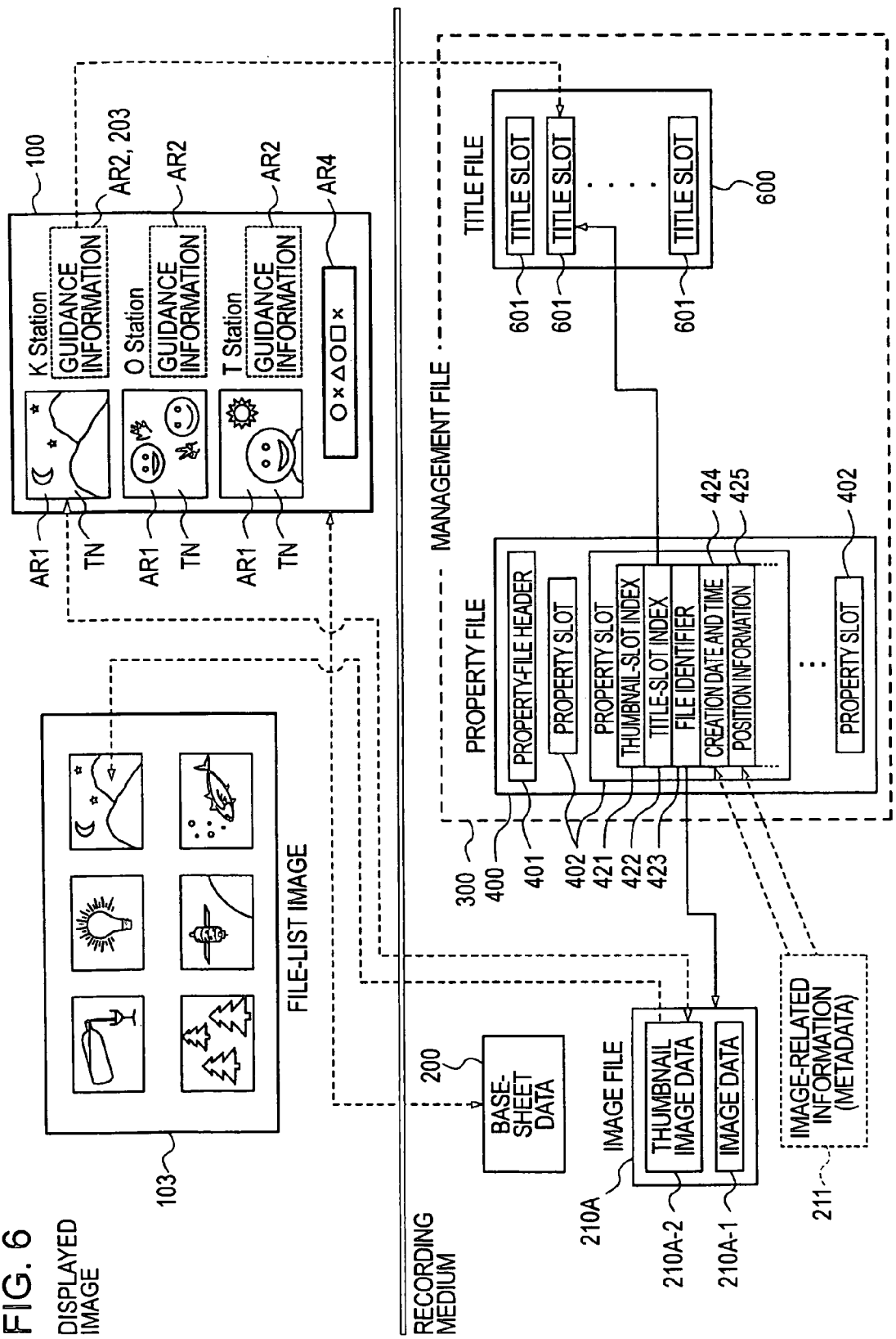
FIG. 6 is a diagram showing another example of management of an image file and metadata (guidance information and image-related information) and an example of information in a corresponding image that is displayed.

FIG. 6 shows an example scheme of management of an image file in a format that is different from the format shown in FIG. 5. In FIG. 6, parts corresponding to those shown in FIG. 5 are designated by the same numerals, and descriptions thereof will be omitted.

The file management scheme shown in FIG. 6 considerably differs from that shown in FIG. 5 in that the management file 300 does not include the thumbnail file 500. The management file 300 in this embodiment includes the property file 400, and optionally includes the thumbnail file 500 and the title file 600.

Thus, in the file management scheme shown in FIG. 6, since the thumbnail file 500 is not provided, regarding the image file 210A, the file is composed of main image data 210A-1 that is the body of the image file and thumbnail-image data 210A-2 associated with the image data 210A-1. Thus, in this case, for example, the image file 210A can be formed by using the thumbnail image data attached and displayed in thumbnail image TN as the thumbnail image data 210A-2. Furthermore, when a file-list image is displayed on the LCD 8, the thumbnail image data 210A-2 can be used to display an icon representing a file.

In the case shown in FIG. 6, the scheme of management of metadata such as the guidance information 203 and the image-related information 211 (position information and date and time information) is the same as that in the case shown in FIG. 5.

In the title slot 601, various types of information (metadata) related to the associated image file 210A, such as metadata that serves as the guidance information 203 described earlier, is stored. For example, the data size of the metadata differs depending on the content thereof, and it is possible that content is added later by a user's input operation or processing by a certain application. However, since it is dictated that the title slot 601 has a fixed length, considering what has been described above, depending on the setting of the size of the title slot 601, it is possible that the capacity of a single title slot 601 is not sufficient to store all information that is to be used.

Figure 7:
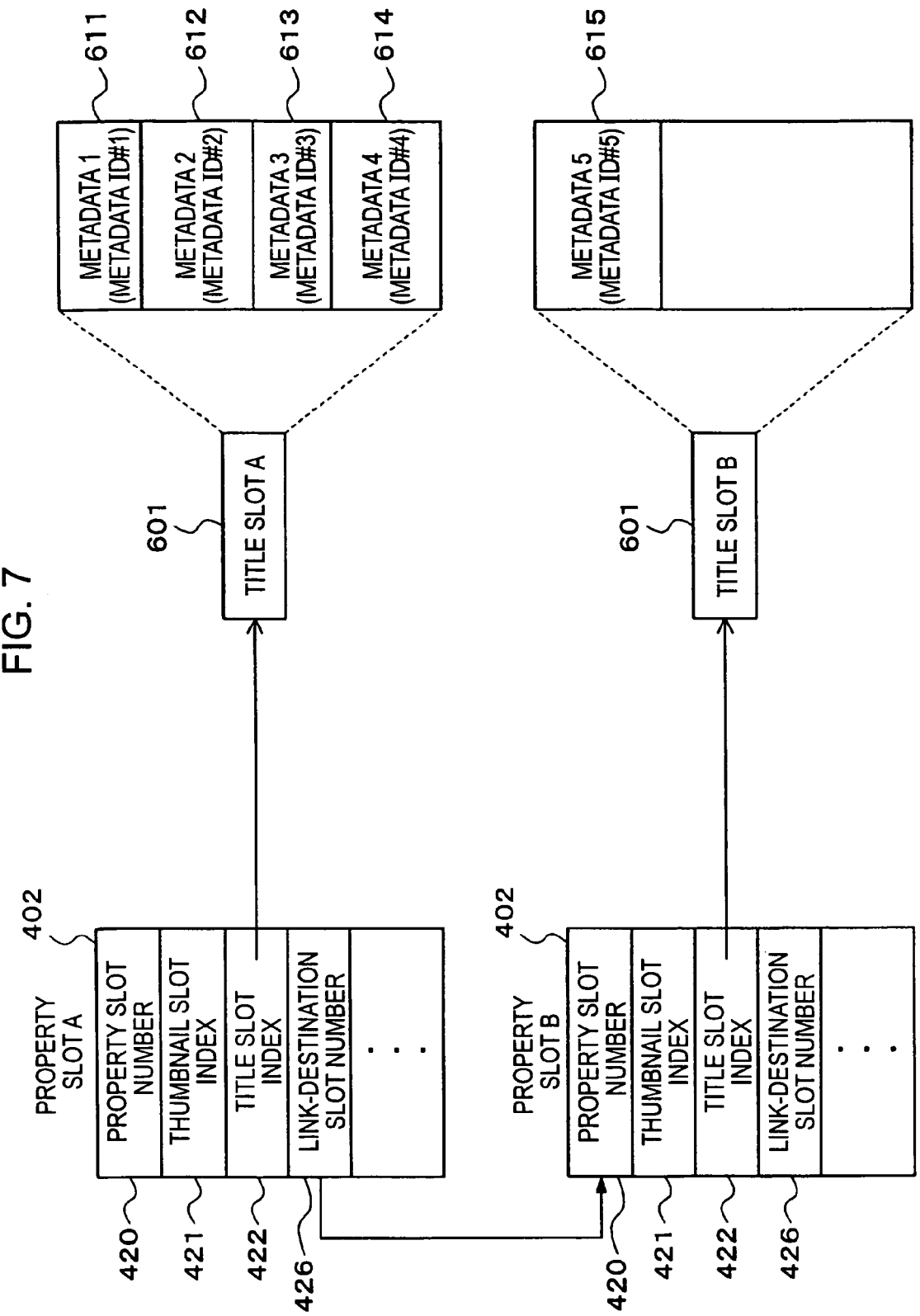
FIG. 7 is a diagram showing an example of extension of a title slot associated with a single image file.

In that case, the size (capacity) of the title slot 601 associated with the single image file 210A can be extended as shown in FIG. 7.

FIG. 7 shows two property slots A and B as property slots 402. In this case, in addition to the thumbnail-slot index 421, the title-slot index 422, and so forth shown in FIGS. 5 and 6, each of the property slots 402 includes information such as a property-slot number 420 and a link-destination slot number 426. The property-slot number 420 is a number that is uniquely assigned to each property slot 402. The link-destination slot number 426 represents the number of a property slot that is to be linked after the current property slot.

As shown in FIG. 7, the content of the title slot A represented by the title-slot index 422 of the property slot A includes metadata 1 having metadata ID#1, metadata 2 (metadata ID#2), metadata 3 (metadata ID#3), and metadata 4 (metadata ID#4), in that order. The title slot A is fully used by these metadata 1 to 4. That is, it is not possible to add further data to the title slot A.

Furthermore, the link-destination slot number 426 of the property slot 426 stores an effective value representing the slot number of the property slot B. Thus, it is indicated that the property slot B is linked after the property slot A.

Referring to the title-slot index 422 of the property slot B, the title-slot index 422 indicates the title slot B. In the title slot B, metadata 5 with metadata ID#5 is stored as shown in FIG. 7.

Thus, a title slot 601 associated with a single image file is managed as a link of a title slot A to a title slot B. By linking the title slot A to the title slot B, the content of the title slot associated with the image file includes metadata 1 (metadata ID#1), metadata 1 (metadata ID#1), metadata 2 (metadata ID#2), metadata 3 (metadata ID#3), metadata 4 (metadata ID#4), and metadata 5 (metadata ID#5). As described above, by linking property slots by a link-destination slot number and specifying a title slot by the title-slot index 422 of each of the property slots, it is possible to associate a plurality of linked title slots with a single image file. That is, it is possible to extend title slots.

Figure 8:
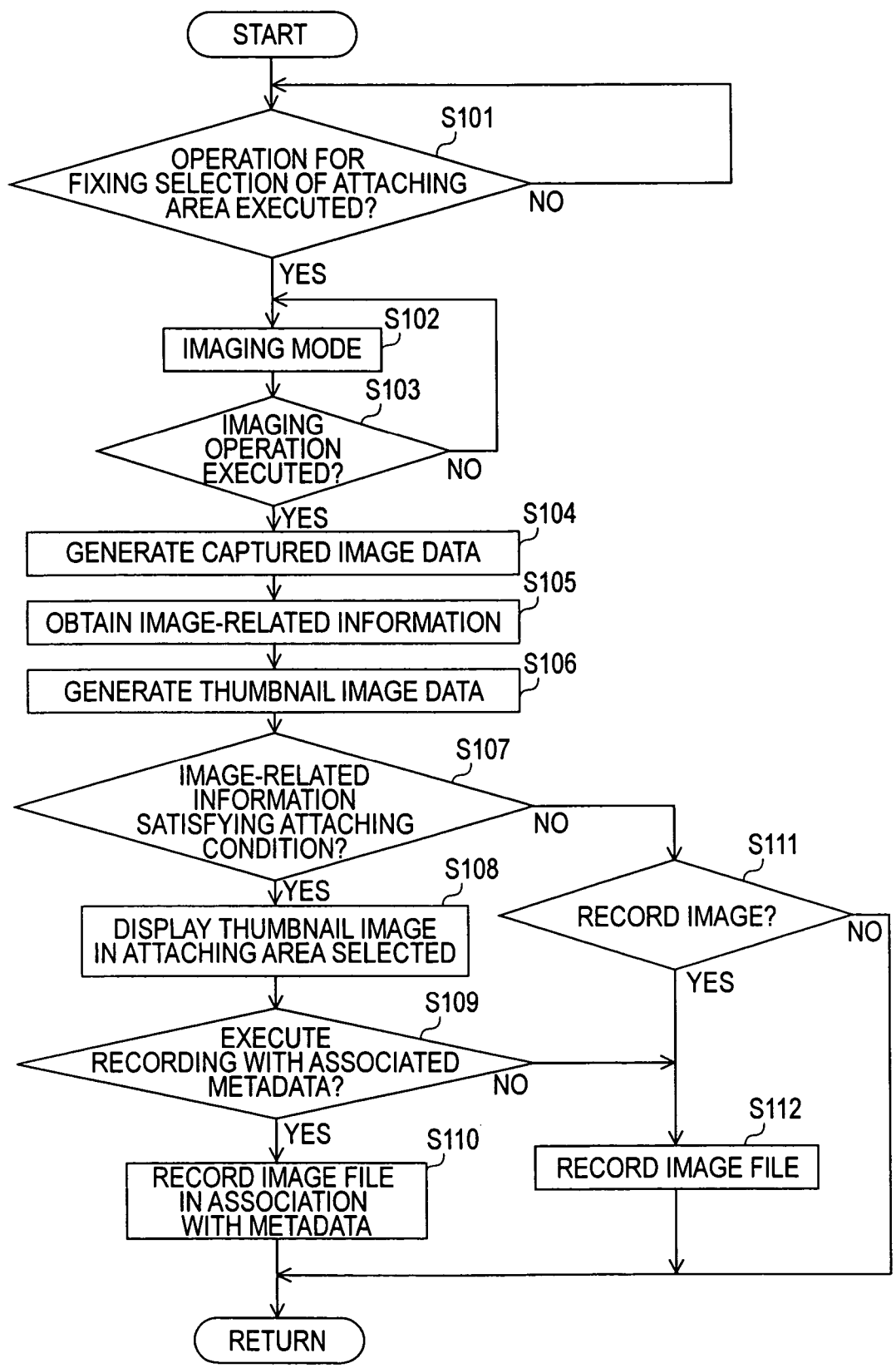
FIG. 8 is a flowchart of a process of using a base-sheet image according to the embodiment.

FIG. 8 is a flowchart showing a process for implementing a stamp rally using the base-sheet image described earlier with reference to FIGS. 2A to 3B. The process shown in FIG. 8 is executed by the CPU 51 executing the execution script (program) 204 of the base-sheet data 200 and a program stored in the flash ROM 53. The process shown in FIG. 8 is executed with the base-sheet data 200 activated and the base-sheet image 100 displayed.

In step S101, as described with reference to FIG. 2A, the process waits for fixing of selection of a thumbnail attaching area AR1 to which a thumbnail image TN is to be attached. When it is determined that selection of a thumbnail attaching area AR1 has been fixed by a user's operation, the process proceeds to step S102.

In step S102, the process enters an imaging mode. At this time, a captured image is displayed on the LCD 8, for example, as shown in FIG. 2B. Captured image data can be obtained by performing a shutter operation in this state.

When it is recognized that an imaging operation has been performed in step S103, the imaging mode is exited, and the process proceeds to step S104.

In step S104, for example, by controlling the camera DSP 2, captured image data of a captured image obtained by an imaging operation is generated. Then, in step S105, image-related information 211 for the captured image data is obtained. That is, date and time information is obtained by capturing information of date and time indicated at that time from the timekeeping circuit 54. Position information is obtained by capturing position information measured by the GPS unit 20. In step S106, using the captured image data generated in step S104, thumbnail image data is generated by the camera DSP 2. The thumbnail image data is a reduced image having a predetermined number of pixels (resolution), for example, generated by decimating pixels from the captured image data according to a predetermined rule.

In step S107, it is checked whether the image-related information 211 obtained in step S105 satisfies the condition indicated as the image-attaching-condition information 202 that is set in association with the thumbnail attaching area AR1 selected in step S101.

For example, the image-attaching-condition information 202 specifies, as conditions for permitting attachment of a thumbnail image, that "the position is within a predetermined radius with respect to a latitude and longitude representing K Station" and that "the imaging date and time is 13:00 to 14:00 of Feb. 5, 2005". In this case, step S10 results in Yes when the position information in the image-related information 211 is "within a predetermined radius with respect to a latitude and longitude representing K Station" and the date and time information is in "13:00 to 14:00 of Feb. 5, 2005".

When step S107 results in Yes, the process proceeds to step S108. In step S108, display control is exercised so that the thumbnail image TN is displayed in the thumbnail attaching area AR1 selected in step S101, using the thumbnail image data generated in step S106. At this time, for example, the script for the base-sheet data (or a markup-language description for displaying the base-sheet image 100) is rewritten so that description specifying thumbnail image data to be displayed in the thumbnail attaching area AR1 is added thereto.

In step S109, it is determined whether to captured image data obtained in step S104 is to be recorded on the recording medium 30 in association with metadata (the guidance information 203). As described earlier with reference to FIG. 3A, this is determined by a user's operation, so that the process waits for a result of user's operation for selecting Yes or No.

When the user selects Yes, step S109 results in Yes. In this case, in step S110, the captured image data is encoded into an image file, and the image file is recorded in association with metadata (the guidance information 203). For this purpose, a property slot 402, a thumbnail slot 501 (omitted in the case shown in FIG. 6), and a title slot 601 associated with the image file to be recorded on the recording medium 30 this time are generated, and relevant data is stored in these slots. At this time, the guidance information 203 is stored in the title slot 601. The image-related information 211 obtained in step S105 is stored in the creation date and time 424 and the position information 425 of the property slot 402.

When the user selects No, the process proceeds to step S112, only the image file of the captured image data is recorded on the recording medium 30 while not recording metadata. However, even in this case, a property slot 601, a thumbnail slot 501 (omitted in the case shown in FIG. 6), and a title slot 601 associated with the image file are generated. Then, areas for recording these slots are allocated on the recording medium 30, and these slots are recorded in the recording areas. However, in this case, the guidance information 203 is not stored in the title slot 601.

At this time, the image-related information 211 (date and time information and position information) is stored in the creation date and time 424 and the position information 425 as information that is to be stored in the property slot 402. Alternatively, the information may be handled as metadata equivalent to the guidance information 203 instead of being stored in the creation date and time 424 and the position information 425.

When step S107 results in No, the process proceeds to step S111. In step S111, for example, with the dialog image shown in FIG. 3B displayed, it is determined whether captured image data is to be recorded on the recording medium 30. For this purpose, a result of user's operation of the yes button Bt1 or the no button Bt2 is waited for as described with reference to FIG. 3B.

When the yes button Bt1 is operated, step S111 results in Yes, so that the process proceeds to step S112, in which captured image data is recorded on the recording medium 30 as an image file. On the other hand, when the No button Bt2 is operated, step S111 results in No. In this case, captured image data is not recorded on the recording medium 30, and the process shown in the figure is exited, and for example, the process returns to the calling routine.

Now, a modification of the GUI for the base-sheet image 100 will be described.

In this modification, the base-sheet image 100 takes the form of an album instead of a base sheet for a stamp rally. In the case of a base sheet for a stamp rally, a thumbnail image is attached to a thumbnail attaching area AR1 each time an image is captured. In contrast, in the case of an album, the user accumulates images captured on tour by recording the images on the recording medium 30 as image files. Then, thumbnail images TN selected from the image file stored on the recording medium 30 as described above is attached to and displayed in thumbnail attaching areas AR1 of the base-sheet image 100 in the form of an album.

Figure 9:
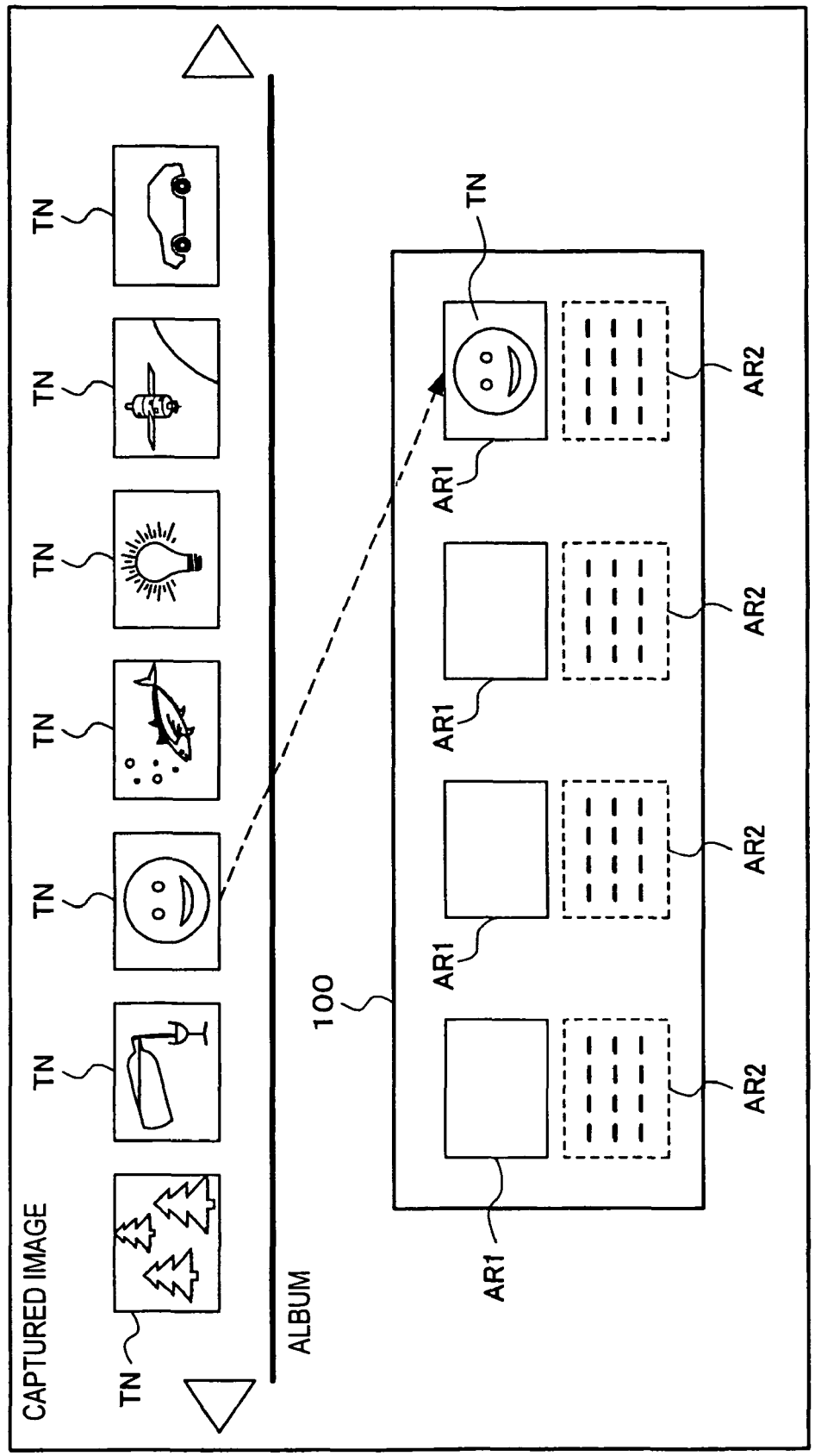
FIG. 9 is a diagram showing a modification of the GUI screen of the base-sheet image.

FIG. 9 shows a GUI screen displayed on the display screen of the LCD 8 for attaching thumbnail images TN on the base-sheet image 100 in the form of an album. Referring to FIG. 9, in an upper part thereof, thumbnail images TN of image files already recorded on the recording medium 30 are displayed as arranged in the horizontal direction. Under the thumbnail images TN, the base-sheet image 100 in the form of an album is displayed. Also in the base-sheet image 100, for each site or place, a pair of a thumbnail attaching area AR1 and a guidance-information displaying area 203 is displayed. With reference to the thumbnail images TN of the image files recorded on the recording medium 30, the user selects a thumbnail image TN (image file) that is to be attached to and displayed in a thumbnail attaching area AR1 of the base-sheet image 100. Then, the user performs an operation to drag-and-drop the thumbnail image TN selected to the thumbnail attaching area AR1. That is, the user instructs association between the image file and the thumbnail attaching area AR1.

Also in this case, it is checked whether metadata (image-related information 211) associated with the image file represented by the thumbnail image TN that has been dragged and dropped satisfies the image attaching condition (the image-attaching-condition information 203) that is set in association with the thumbnail attaching area AR1 (step S107 shown in FIG. 8). When the image attaching condition is satisfied, the thumbnail image TN is attached to and displayed in the thumbnail attaching area AR1 at the destination of drag and drop. When the thumbnail image TN is attached and displayed, the guidance information 203 associated with the thumbnail attaching area AR1 where the thumbnail image TN is attached and displayed is associated with the image file represented by the thumbnail image TN as metadata. At this time, the guidance information 203 is additionally recorded in the relevant title slot 601, and the management file 300 is updated.

As described above, also when the base-sheet image 100 takes the form of an album, it is possible to provide a function that allows attachment of a thumbnail image TN to a thumbnail attaching area AR1 only when metadata associated with an image file satisfies image-attaching-condition information 202 that is set for each thumbnail attaching area AR1 on the base-sheet image 100.

Figure 10:
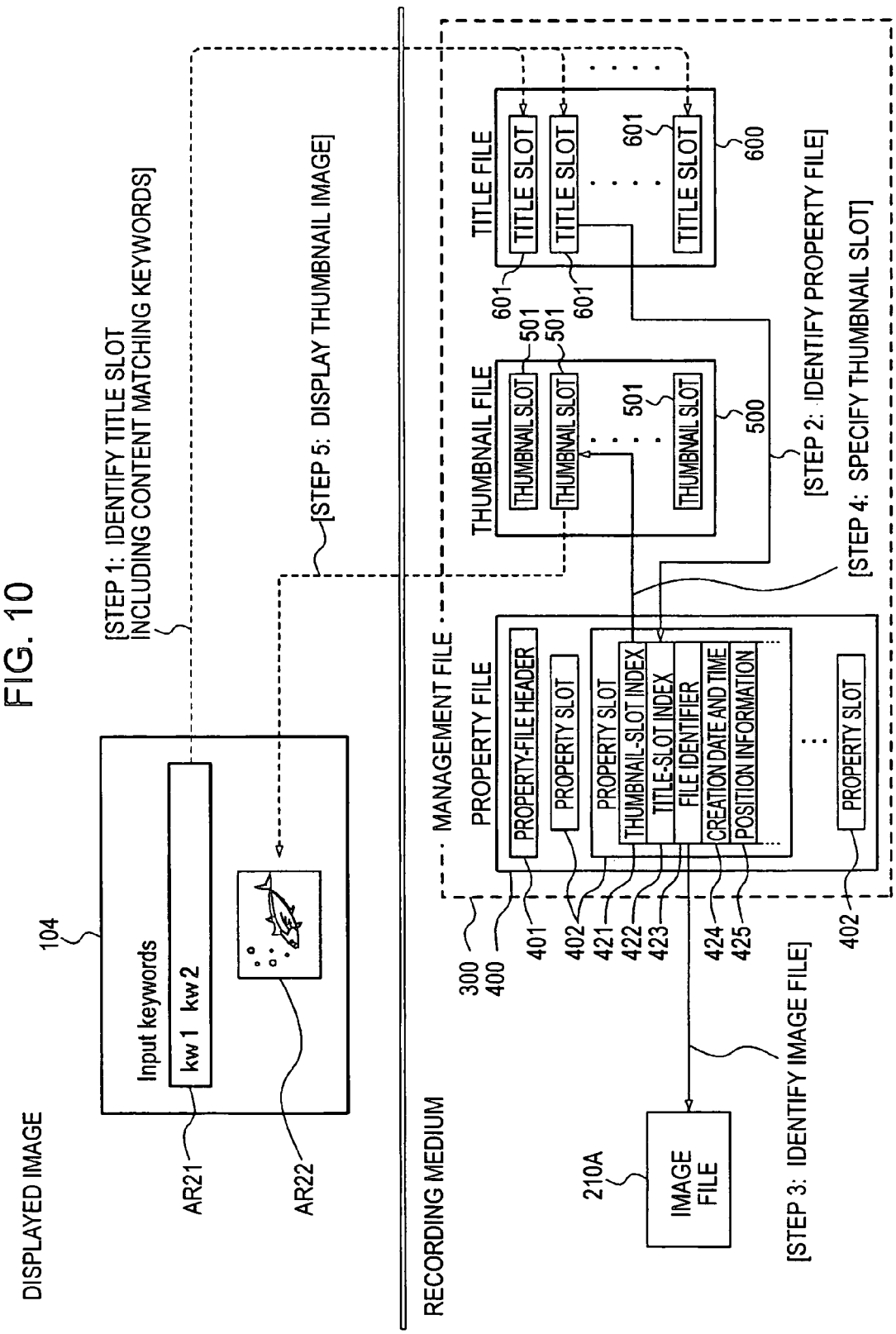
FIG. 10 is a schematic diagram showing a procedure of searching for an image file according to the embodiment.

From what has been described above, in the imaging device 1 according to this embodiment, an image file 210 recorded on the recording medium 30 is managed as associated with metadata by the management file 300. Using this scheme, the imaging device 1 according to this embodiment can search for an image file recorded on the recording medium 30 using metadata as a search condition. In FIG. 10, parts corresponding to those shown in FIG. 5 or FIG. 6 are designated by the same numerals, and descriptions thereof will be omitted.

For example, when a searching mode is selected by a predetermined operation on the imaging device 1, a searching screen 104 is displayed in the display screen of the LCD 8 in a display mode shown in an upper part of FIG. 10.

The searching screen 104 at least includes a keyword (search keywords or search conditions) inputting area AR21 and a searching-result displaying area AR22.

The user can enter a word or phrase as a keyword (kw) in the keyword inputting area AR21 by a predetermined character inputting operation. As in the case of ordinary keyword entry, the keyword entry may allow entry of a plurality of words or phrases using AND, OR, or the like as search condition.

When a predetermined operation for executing searching is executed after entering keywords as described above, the imaging device 1 starts a searching process.

The searching process in this embodiment is executed, for example, in order of steps 1 to 5 shown in FIG. 10.

First, in step 1, a title slot 601 including content of word or phrase matching the keyword entered is identified from the title file 600 of the management file 300.

When the title slot 601 has been identified, then, in step 2, a property slot 402 including a title-slot index 422 representing the title slot 601 is identified from the property file 400. In step 3, a single image file 210 is identified by referring to the file identifier of the property slot 402 identified. The image file 210 identified is an image file retrieved as matching the keyword input by the user.

The searching result obtained as described above is output by displaying a thumbnail image TN of the image file retrieved in the searching screen 104. For this purpose, in step 4, by referring to the thumbnail-slot index 421 of the property slot 402 identified in step 2, a corresponding thumbnail slot 501 is designated. Then, in step 5, thumbnail image data stored in the thumbnail slot 501 designated is read, and a thumbnail image is displayed in the searching-result displaying area AR22 on the basis of the thumbnail image data. As described above, in this embodiment, when a thumbnail image is displayed as a searching result, thumbnail image data stored in the thumbnail slot 501 of the thumbnail file 500 can be used. That is, it is not needed to execute image signal processing for generating a thumbnail image from an original image file each time.

When two or more image files matching the keyword are found as a result of searching (i.e., when two or more title slots 601 match the keyword in step 2), thumbnail images TN respectively associated with the plurality of image files are displayed in the searching-result displaying area AR22. From the state where the searching results are output, for example, more specific searching may be allowed.

In the searching-result displaying area AR22, together with the thumbnail image TN, information elements forming the property slot 402, such as the creation date and time 424 and the position information 425, and information associated with guidance information and so forth stored in the title slot 601 (i.e., metadata of the image file), is displayed, for example, in the form of characters, so that a larger amount of information regarding the image file of the searching result can be presented.

Figure 11:
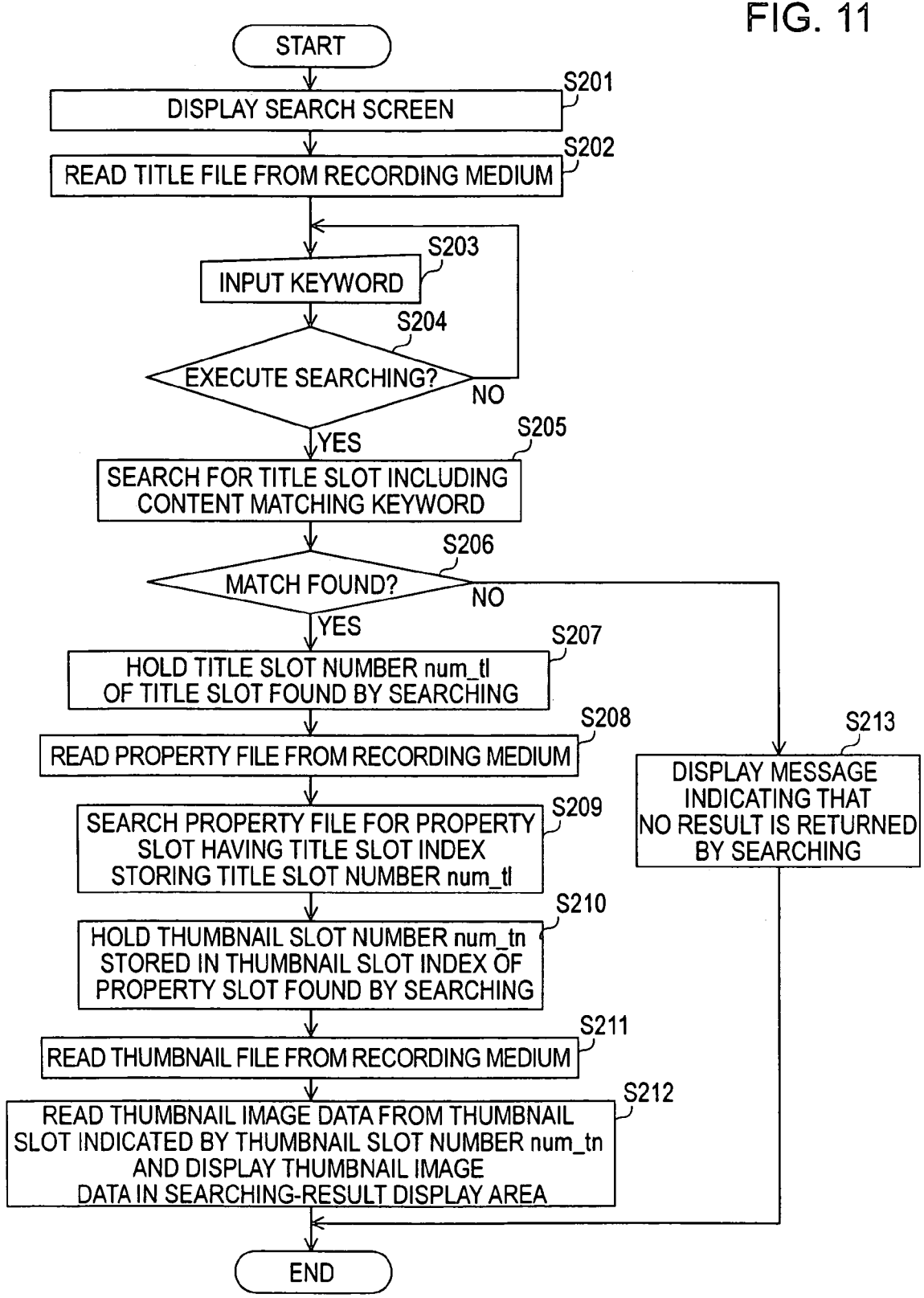
FIG. 11 is a flowchart showing a procedure of searching for an image file according to the embodiment.

FIG. 11 is a flowchart of the searching process described with reference to FIG. 10, which is executed by the CPU 51. For the process shown in FIG. 11, the CPU 51 executes a program stored in the flash ROM 53. When the searching function is associated with the base-sheet data 200, an execution script (program) 204 of the base-sheet data 200 is executed.

As described earlier, when the image-file searching mode is instructed by a user's operation on the imaging device 1, in step S201, a GUI screen for searching for an image file, i.e., the searching screen 104, is displayed.

With the searching screen 104 displayed, in step S202, the title file 600 of the management file 300 on the recording medium 30 is accessed to read the title file 600. The title file 600 that has been read is held in the RAM 52.

In step S203, processing for keyword input in accordance with a user's operation is executed. At this time, data of a keyword input by the operation is held in the RAM 52, and processing for controlling display so that a character string of the keyword (searching condition) entered is displayed in the keyword inputting area AR21 on the searching screen 104. Then, for example, when a user's operation for instructing execution of searching is performed, step S204 results in Yes, so that the process proceeds to step S205.

In step S205, the content of the title slot 601 of the title file 600 held in the RAM 52 in step S202 is compared with the keyword fixed through steps S203 and S204 to search for (identify) a title slot 601 including content matching the keyword. This corresponds to step 1 shown in FIG. 10. Then, in step S206, it is checked whether a title slot 601 including content matching the keyword exists as a result of searching in step S205. When step S206 results in Yes, the process proceeds to step S207. On the other hand, when step S206 results in No, the process proceeds to step S213.

In step S207, the title slot number of the title slot identified by the searching as a title slot including content matching the keyword in step S205 is held as num_tl. The title slot number is a number for individually identifying each title slot 601 in the title file 600. The title-slot index 422 in the property slot 402 designates a title slot 601 by storing the title slot number. The association between the title slot number and the title slot 601 is defined, for example, by storing the title slot number in a predetermined location of the structure of the title slot 601. Alternatively, since the title slot file 600 can be considered as a structure sequentially storing fixed-length title slots 601 from the beginning, the order of storage in the title file 600 can be used as title slot numbers.

In step S208, the property file 400 of the management file 300 stored on the recording medium 30 is accessed to read the property file 400 from the recording medium 30 and store the property file 400 in the RAM 52.

In step S209, of the property slots 402 of the property file 400 held in the RAM 52, a property slot 402 having a title-slot index 422 storing the title slot number num_tl held in step S207 is searched for (identified). This corresponds to step 2 shown in FIG. 9. Furthermore, by searching for the property slot 402 in step S209, the associated image file 210 is uniquely represented by the file identifier 423. That is, by searching for the property slot 402 in step S209, an image file is identified in step 3 shown in FIG. 9.

Step S210 and subsequent steps are executed to display a searching result in the searching-result displaying area AR22.

First, in step S210, a thumbnail slot number stored in the thumbnail slot index 421 of the property slot 402 found by the searching in step S209 is held as num_tn. Similarly to the title slot number, the thumbnail slot number is a number for individually identifying each thumbnail slot 501 in the thumbnail file 500. The thumbnail slot index 421 of the property slot 402 designates a thumbnail slot 501 by storing the thumbnail slot number. Furthermore, the association between the thumbnail slot number and the thumbnail slot 501 may be defined by storing the thumbnail slot number at a predetermined location of the structure of the thumbnail slot 501. Alternatively, the order of storage of thumbnail slots 501 (fixed length) in the thumbnail file 500 can be used as thumbnail slot numbers.

In step S211, the thumbnail file 500 of the management file 300 stored on the recording medium 30 is accessed to read the thumbnail file 500 from the recording medium 30 and store the thumbnail file 500 in the RAM 52.

Then, in step S212, of the thumbnail slots 501 stored in the thumbnail file 500 stored in the RAM 52 in step S211, a thumbnail slot 501 represented by the thumbnail slot number num_tn is accessed (corresponding to step 4 shown in FIG. 10). Then, thumbnail image data stored in the thumbnail slot 501 accessed is read. Furthermore, display control is exercised so that a thumbnail image corresponding to the thumbnail image data is displayed in the searching-result displaying area AR22 of the searching screen 104 (corresponding to step 5 shown in FIG. 10). When the content of metadata is also displayed in the searching-result displaying area AR22, relevant information is read from the property slot 402 found by the searching in step S209 and a title slot 205 designated by the title-slot index 422 of the property slot 402, and the information is decoded so that the information can be displayed in the form of text.

In step S213, in accordance with step S206 resulting in No, a message indicating that no image file matching the keyword exists is displayed as a result of searching on the search screen 104 in a predetermined display mode.

For example, when the file format is such that metadata is included in the image file structure itself, in the case of a method in which a search result is obtained on the basis of matching between keywords and metadata, image files themselves are to be sequentially accessed and opened to search for an image file. In this embodiment, when searching for an image file, a title file 600 for the management file 300 is used. The title file 600 is a structure that is managed as a single subfile in the management file 300. That is, in this embodiment, it is possible to search for an image file by accessing a single file. That is, in this embodiment, the speed of searching is improved and the load of searching is reduced by using the management file 300.

Furthermore, as described earlier, the subfiles in the management file 300, namely, the property file 400, the thumbnail file 500, and the title file 600 respectively include fixed-lengths property slots 402, thumbnail slots 501, and title slots 601 that are sequentially arranged. Thus, when the management file 300 is used in the searching (including displaying of a searching result) described above; or other types of processing, a slot can be readily accessed on the basis of, for example, the slot size in a subfile, instead of accessing it on the basis of, for example, an address.

In this embodiment, metadata associated with an image file is compared with a keyword in searching for an image file. The metadata is supposed to be the image-related information 211 or the guidance information 203 in the base-sheet data 200. The image-related information 211 is date and time, position information, or the like related to imaging. The content of the guidance information 203 is determined, for example, by a travel agency when the base-sheet data 200 is created. That is, the content of metadata does not reflect personal sense, intention, preference, or so forth of the user operating the imaging device 1, but it is rather objective so that it can be shared among a large number of users. That is, the content of metadata is versatile. Thus, management of an image file captured using the base-sheet data 200 in this embodiment, including searching, is equally easy to use for a large number of users.

As described earlier, in this embodiment, there is no particular limitation as to the route of obtaining the base-sheet data 200 and storing the base-sheet data 200 on the recording medium 30 or the flash ROM 53.

An example will be described in which the external interface 9 of the imaging device 1 is connected to a predetermined server via a network such as the Internet so that base-sheet data can be downloaded from the server.

Figure 12:
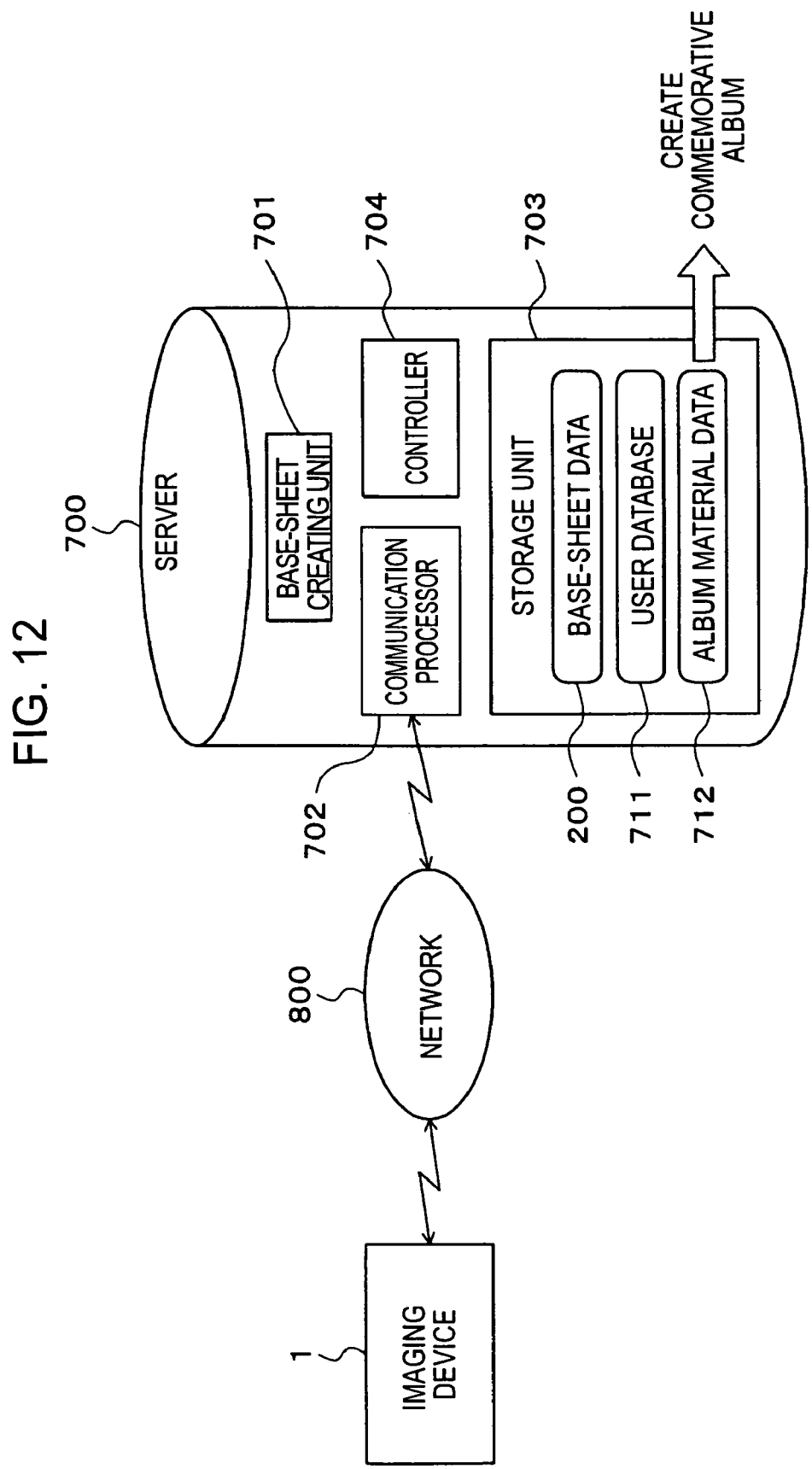
FIG. 12 is a diagram showing a system configuration in a case where base-sheet data is downloaded from a server.

FIG. 12 shows an example of system configuration in a case where the imaging device 1 downloads the base-sheet data 200 from a server. In this case, as shown in FIG. 12, the imaging device 1 is connected to a network 800. For the purpose of connection with the network 800, the external interface 9 is configured so as to allow connection with the network 800. Thus, communication with a server 700 also connected to the network 800 is allowed.

The server 700 includes, for example, a base-sheet-data creating unit 701, a communication processor 702, a storage unit 703, and a controller 704, as shown in FIG. 12.

The base-sheet-data creating unit 701 is composed of various types of hardware and software for creating the base-sheet data 200, and it creates the base-sheet data 200 having the structure shown in part (a) of FIG. 4. The content of the base-sheet data 200 created differs depending on, for example, travel plans that are prepared.

The communication processor 702 is composed of hardware and software for connecting to the network 800 and for carrying out communications with other devices via the network 800. The communication processor 702 allows communications with the imaging device 1 connected to the network 800.

The storage unit 703 includes a large-capacity storage medium such as a hard disk (HDD), so that various types of information or data can be stored therein as needed. In this embodiment, information that is to be stored in the storage unit 703 includes, for example, the base-sheet data 200, a user database 711, album material data 712, and so forth.

The base-sheet data 200 is created by a base-sheet creating apparatus 701. The user database 711 is constructed using information regarding users who have downloaded the base-sheet data 200. The album material data 712 is transmitted from the imaging device 1 as will be described later.

The controller 704 exercises various types of control on the server 700 including the components described above.

As described earlier, at the server 700, the base-sheet creating unit 701 creates a plurality of types of base-sheet data 200 in accordance with traveling plans or the like, and the base-sheet data 200 is stored in the storage unit 703.

The user of the imaging device 1 connects the imaging device 1 with the server 700 via the network 800, and performs user registration. That is, by the imaging device 1, the user sends information used for user registration (user registration information) by a predetermined operation on the imaging device 1. The user registration information includes, for example, a user name, a user ID, and a device ID for individually identifying the imaging device 1. Furthermore, when user authentication is to be executed for subsequent use of the server 700, user authentication data such as a password may be included.

Upon receiving the user registration information, the server 700 executes processing for newly registering a user in the user database 711.

Simultaneously with sending of the user registration information or after sending the user registration information, the user operates the imaging device 1 to request the server 700 to send the base-sheet data 200 via the network 800, i.e., to request downloading of the base-sheet data 200.

Upon receiving the request for the base-sheet data 200, the server 700 executes user authentication, for example, by comparing the imaging device ID, the user ID, the authentication password, and the like transmitted with the request with information registered in the user database 711. Then, for example, when the user authentication succeeds, the server sends the requested base-sheet data 200 to the imaging device 1.

Upon receiving the base-sheet data 200 transmitted, the imaging device 1 stores the base-sheet data 200, for example, in the recording medium 30 or the flash ROM 53.

The user of the imaging device 1 can participate in a stamp rally by activating the base-sheet data 200 as described earlier. By attaching a thumbnail image TN of a captured image as described earlier, the execution script (program) 204 of the base-sheet data 200 is edited so that association between a thumbnail attaching area AR1 and an image file to be attached and displayed is described therein.

By storing the base-sheet data 200 edited as described above on the recording medium 30 together with the image file of the picture (and the management file 300), by the imaging device 1, the user can play back and view the base-sheet image 100 with a thumbnail image of the picture (image file) captured by the user attached to and displayed in the base-sheet image 100. Furthermore, in this embodiment, the user can enjoy a service of preparing a commemorative album that is bounded similarly to the base-sheet image 100 prepared as described above.

For this purpose, the user operates the imaging device 1 to send album material data from the imaging device 1 to the server 700 via the network 800. The album material data at least includes the edited base-sheet data 200, and an image file corresponding to a thumbnail image that is to be displayed in the thumbnail attaching area AR1 of the base-sheet data 200. Before sending these pieces of data, for example, these pieces of data are read from the recording medium 30 or the flash ROM 53, and are converted into a predetermined format of album material data.

Upon receiving the album material data 712, the server 700 stores the album material data 712 in the storage unit 703 and holds it for a certain period as needed.

Then, the album material data 712 stored in the storage unit 703 is passed to an agent that produces a commemorative album. The agent produces a commemorative album using the album material data 712. The commemorative album is passed to the user of the imaging device 1 via a suitable route.

In the base-sheet image 100 shown in FIGS. 5 and 6, an advertisement-image displaying area AR4 is shown. In the advertisement-image displaying area AR4, an image for a certain advertisement is displayed. In order to display an advertisement image in the base-sheet image 100, for example, when the base-sheet data 200 is created, an advertisement image is prepared as base-sheet image data 201, and the execution script (program) 204 is written so that the advertisement image is displayed at an appropriate position.

By displaying the advertisement-image displaying area AR4 as described above, the base-sheet image 100 can be used as an advertisement. For example, it is beneficial for a travel agent that provides the base-sheet data 200 to use the advertisement in the advertisement-image displaying area AR4 so that other commercial products or services of the company will be publicized. Alternatively, an income of an advertisement fee can be expected by displaying an advertisement of a company different from the travel agent that provides the base-sheet data 200 in the advertisement-image displaying area AR4.

Furthermore, for example, the base-sheet data 200 may be constructed so that it is possible to access a predetermined associated website via a network by performing an operation corresponding to clicking in the advertisement-image displaying area AR4, similarly to an ordinary Web page.

Although the base-sheet data 200 is used for sightseeing in the embodiment described above, application of the base-sheet data 200 is not limited to sightseeing. For example, the base-sheet data 200 can be used for games other than stamp rallies. Furthermore, although it is presumed in the above description that an image file (captured image data) that serves as a basis of a thumbnail image TN that is attached to and displayed on the base-sheet image 100 is a still picture, the image file may be a moving picture. When the image file is a moving picture, thumbnail image data of still pictures extracted as representatives according to a predetermined rule is generated, and corresponding thumbnail images TN are attached to and displayed on the base-sheet image 100. Alternatively, depending on the image processing ability of the imaging device 1, a thumbnail image TN of a moving picture may be attached to and displayed on the base-sheet image 100. In accordance with what has been described above, an information processing apparatus according to an embodiment of the present invention may be a digital still camera or a video camera. Furthermore, application to devices other than imaging devices is also possible.

In the embodiment described above, in order to implement the GUI screen of the base-sheet image 100, the CPU executes an execution script or program of the base-sheet data 200. That is, the base-sheet data (function data) includes data of a program for implementing the GUI screen. Alternatively, the execution program (script) may be excluded from the base-sheet data 200, and a program corresponding to the base-sheet image 100 may be installed and stored separately from the base-sheet data 200. By the execution of the program by the CPU, the GUI screens described with reference to FIGS. 2, 3, and 9 are implemented using the base-sheet image data of the base-sheet data, attaching-condition information, guidance information, and so forth.

As for files represented by thumbnail images TN, instead of images files 210A, for example, audio data files may be used. In this case, as a thumbnail image TN attached to and displayed on the base-sheet image 100, for example, a pattern or design representing an audio data file is used. For example, when the audio data file is a piece of music, a jacket of an album including the piece of music, or a picture of the artist, may be used.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus, comprising:
  image-information obtaining means for obtaining first image information;
  display processing means for using function data including at least second image information and condition information to display an image of the second image information on a display, and for allowing display of a representative image representing the first image information on a predetermined area of the displayed image of the second image information;
  determining means for determining whether the content of first related information associated with the first image information satisfies a condition represented by the condition information; and
  display controlling means for causing the display processing means to display the representative image only when the determining means determines that the condition is satisfied,
  the function data further includes second related information having certain content that is associable with the predetermined area, and the information processing apparatus further comprises associating means for associating the first image information with the second related information when the determining means determines that the condition is satisfied,
  the first image information and the second related information being associated by storing the first image information and the second related information on a recording medium with the first related information, and the first related information including at least information representing a position of the image-information obtaining means at the time of obtaining the first image information,
  the first related information and second related information being included in a management file which is stored on the recording medium, the management file including a property subfile, a thumbnail subfile and a title subfile, the first related information being stored in the property subfile, and the second related information being stored in the title subfile,
  the property subfile includes a single property-file header and one or more fixed-length property slots provided in association with respective image files, the thumbnail subfile includes one or more fixed-length thumbnail slots each associated with a single image file and storing thumbnail image data representing the associated image file, and the title subfile includes one or more fixed length title slots each associated with a single image file.

2. The information processing apparatus according to claim 1, wherein
  the function data includes condition information associated with each predetermined image area of the second image information, and
  the determining means determines whether the content of the first related information associated with the first image information satisfies a condition represented by the condition information associated with an image area of the second image information selected as an image area in which the representative image is to be displayed.

3. The information processing apparatus according to claim 1, wherein
  the function data includes second related information associated with each predetermined image area of the second image information, and
  the apparatus further comprises recording means for recording on a recording medium the second related information associated with an area of the second image information where the representative image is displayed so that the second related information is associated with the first image information represented by the representative image.

4. The information processing apparatus according to claim 1, further comprising:
  searching means for searching for first image information recorded on a recording medium, the searching means executing searching by comparing an input search condition with the content of first related information and/or second related information recorded on the recording medium in association with the first image information.

5. An information processing method, comprising:
  obtaining first image information through use of an imaging apparatus;
  using function data including at least second image information and condition information to display an image of the second image information on a display, and allowing display of a representative image representing the first image information on a predetermined area of the displayed image of the second image information;
  determining whether the content of first related information associated with the first image information satisfies a condition represented by the condition information when displaying the representative image; and
  displaying the representative image only when it is determined that the condition is satisfied,
  the function data further includes second related information having certain content that is associable with the predetermined area, and the information processing apparatus further comprises associating means for associating the first image information with the second related information when it is determined that the condition is satisfied, the first image information and the second related information being associated by storing the first image information and the second related information on a recording medium with the first related information, and the first related information including at least information representing a position of the imaging apparatus at the time of obtaining the first image information, the first related information and second related information being included in a management file which is stored on the recording medium, the management file including a property subfile, a thumbnail subfile and a title subfile, the first related information being stored in the property subfile, and the second related information being stored in the title subfile, the property subfile includes a single property-file header and one or more fixed-length property slots provided in association with respective image files, the thumbnail subfile includes one or more fixed-length thumbnail slots each associated with a single image file and storing thumbnail image data representing the associated image file, and the title subfile includes one or more fixed length title slots each associated with a single image file.

6. An information processing system including a server apparatus and a terminal apparatus, the information processing system comprising:

creating means, provided at the server apparatus, for creating function data including at least second image information and condition information;

first sending means, provided at the server apparatus, for sending the function data from the server apparatus to the terminal apparatus via a predetermined communication network;

holding means, provided at the terminal apparatus, for receiving and holding the function data sent from the server apparatus;

image-information obtaining means, provided at the terminal apparatus, for obtaining first image information;

display processing means, provided at the terminal apparatus, for displaying an image of the second image information on a display on the basis of the function data held by the holding means, and for allowing display of a representative image representing the first image information on a predetermined area of the displayed image of the second image information;

determining means, provided at the terminal apparatus, for determining whether the content of first related information associated with the first image information satisfies a condition represented by the condition information;

display controlling means, provided at the terminal apparatus, for causing the display processing means to display the representative image only when the determining means determines that the condition is satisfied; and second sending means, provided at the terminal apparatus, for sending to the server apparatus at least information representing a result of display of the representative image on the image of the second image information and the first image information, the function data further includes second related information having certain content that is associable with the predetermined area, and the information processing apparatus further comprises associating means for associating the first image information with the second related information when the determining means determines that the condition is satisfied, the first image information and the second related information being associated by storing the first image information and the second related information on a recording medium with the first related information, and the first related information including at least information representing a position of the image-information obtaining means at the time of obtaining the first image information, the first related information and second related information being included in a management file which is stored on the recording medium, the management file including a property subfile, a thumbnail subfile and a title subfile, the first related information being stored in the property subfile, and the second related information being stored in the title subfile, the property subfile includes a single property-file header and one or more fixed-length property slots provided in association with respective image files, the thumbnail subfile includes one or more fixed-length thumbnail slots each associated with a single image file and storing thumbnail image data representing the associated image file, and the title subfile includes one or more fixed length title slots each associated with a single image file.

7. An information processing apparatus, comprising:

an image-information obtaining unit configured to obtain first image information;

a display processor configured to use function data including at least second image information and condition information to display an image of the second image information on a display, and to allow display of a representative image representing the first image information on a predetermined area of the displayed image of the second image information;

a determining unit configured to determine whether the content of first related information associated with the first image information satisfies a condition represented by the condition information; and a display controller configured to cause the display processor to display the representative image only when the determining unit determines that the condition is satisfied, the function data further includes second related information having certain content that is associable with the predetermined area, and the information processing apparatus further comprises associating means for associating the first image information with the second related information when the determining unit determines that the condition is satisfied, the first image information and the second related information being associated by storing the first image information and the second related information on a recording medium with the first related information, and the first related information including at least information representing a position of the image-information obtaining unit at the time of obtaining the first image information, the first related information and second related information being included in a management file which is stored on the recording medium, the management file including a property subfile, a thumbnail subfile and a title subfile, the first related information being stored in the property subfile, and the second related information being stored in the title subfile, the property subfile includes a single property-file header and one or more fixed-length property slots provided in association with respective image files, the thumbnail subfile includes one or more fixed-length thumbnail slots each associated with a single image file and storing thumbnail image data representing the associated image file, and the title subfile includes one or more fixed length title slots each associated with a single image file.

8. An information processing system including a server apparatus and a terminal apparatus, the information processing system comprising:

a creating unit, provided at the server apparatus, configured to create function data including at least second image information and condition information;

a first sending unit, provided at the server apparatus, configured to send the function data from the server apparatus to the terminal apparatus via a predetermined communication network;

a holding unit, provided at the terminal apparatus, configured to receive and hold the function data sent from the server apparatus;

an image-information obtaining unit, provided at the terminal apparatus, configured to obtain first image information;

a display processor, provided at the terminal apparatus, configured to display an image of the second image information on a display on the basis of the function data held by the holding unit, and to allow display of a representative image representing the first image information on a predetermined area of the displayed image of the second image information;

a determining unit, provided at the terminal apparatus, configured to determine whether the content of first related information associated with the first image information satisfies a condition represented by the condition information;

a display controller, provided at the terminal apparatus, configured to cause the display processor to display the representative image only when the determining unit determines that the condition is satisfied; and a second sending unit, provided at the terminal apparatus, configured to send to the server apparatus at least information representing a result of display of the representative image on the image of the second image information and the first image information, the function data further includes second related information having certain content that is associable with the predetermined area, and the information processing apparatus further comprises associating means for associating the first image information with the second related information when the determining unit determines that the condition is satisfied, the first image information and the second related information being associated by storing the first image information and the second related information on a recording medium with the first related information, and the first related information including at least information representing a position of the image-information obtaining unit at the time of obtaining the first image information, the first related information and second related information being included in a management file which is stored on the recording medium, the management file including a property subfile, a thumbnail subfile and a title subfile, the first related information being stored in the property subfile, and the second related information being stored in the title subfile, the property subfile includes a single property-file header and one or more fixed-length property slots provided in association with respective image files, the thumbnail subfile includes one or more fixed-length thumbnail slots each associated with a single image file and storing thumbnail image data representing the associated image file, and the title subfile includes one or more fixed length title slots each associated with a single image file.

* * * * *